Sept. 9, 1941.　　　　M. S. CURTIS　　　　2,255,739
MACHINE TOOL
Filed June 8, 1938　　　　13 Sheets-Sheet 1
Fig. 1.
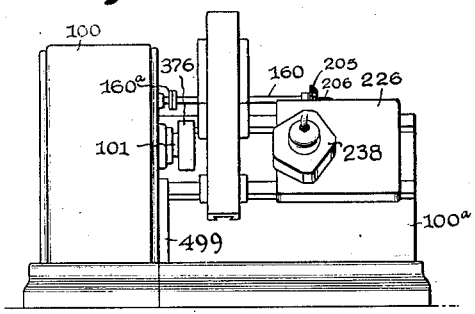
TURRET LATHE
Fig. 2.
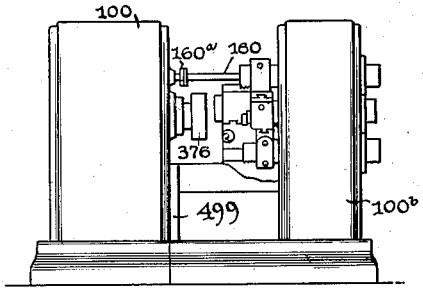
SINGLE-CUT CHUCKING LATHE
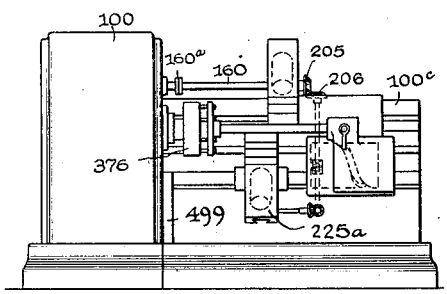
CENTER-TURNING LATHE
Fig. 3
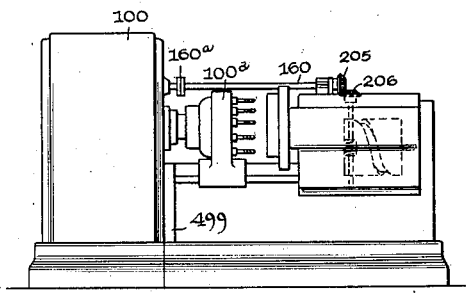
MULTI-SPINDLE DRILL
Fig. 4
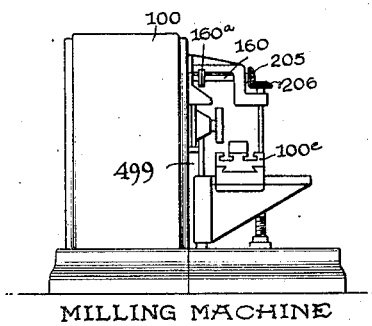
MILLING MACHINE
Fig. 5.
Inventor
Myron S. Curtis
By Sept. 9, 1941. M. S. CURTIS 2,255,739
MACHINE TOOL
Filed June 8, 1938 13 Sheets-Sheet 2

Inventor
Myron S. Curtis
By
Attorney

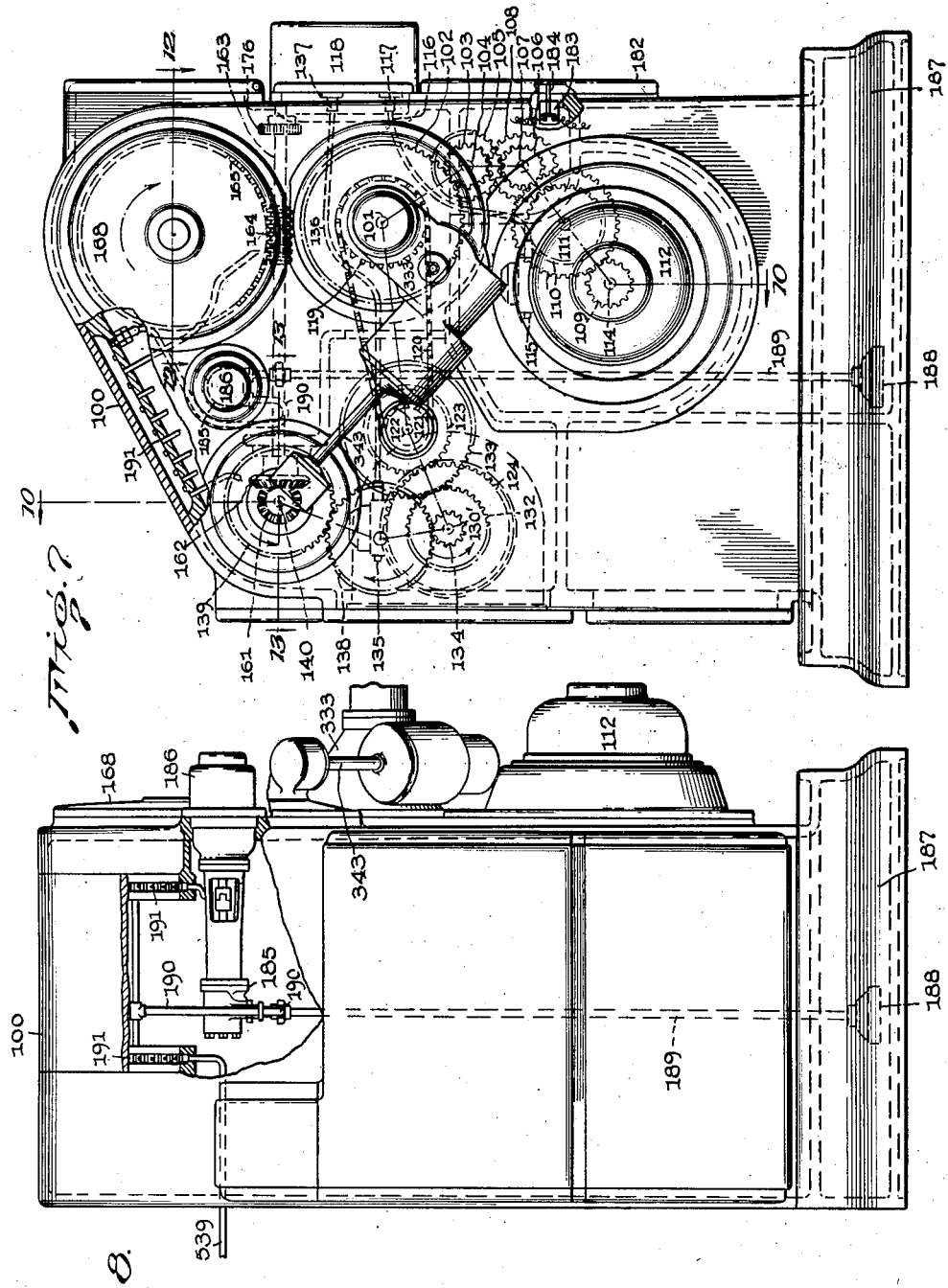

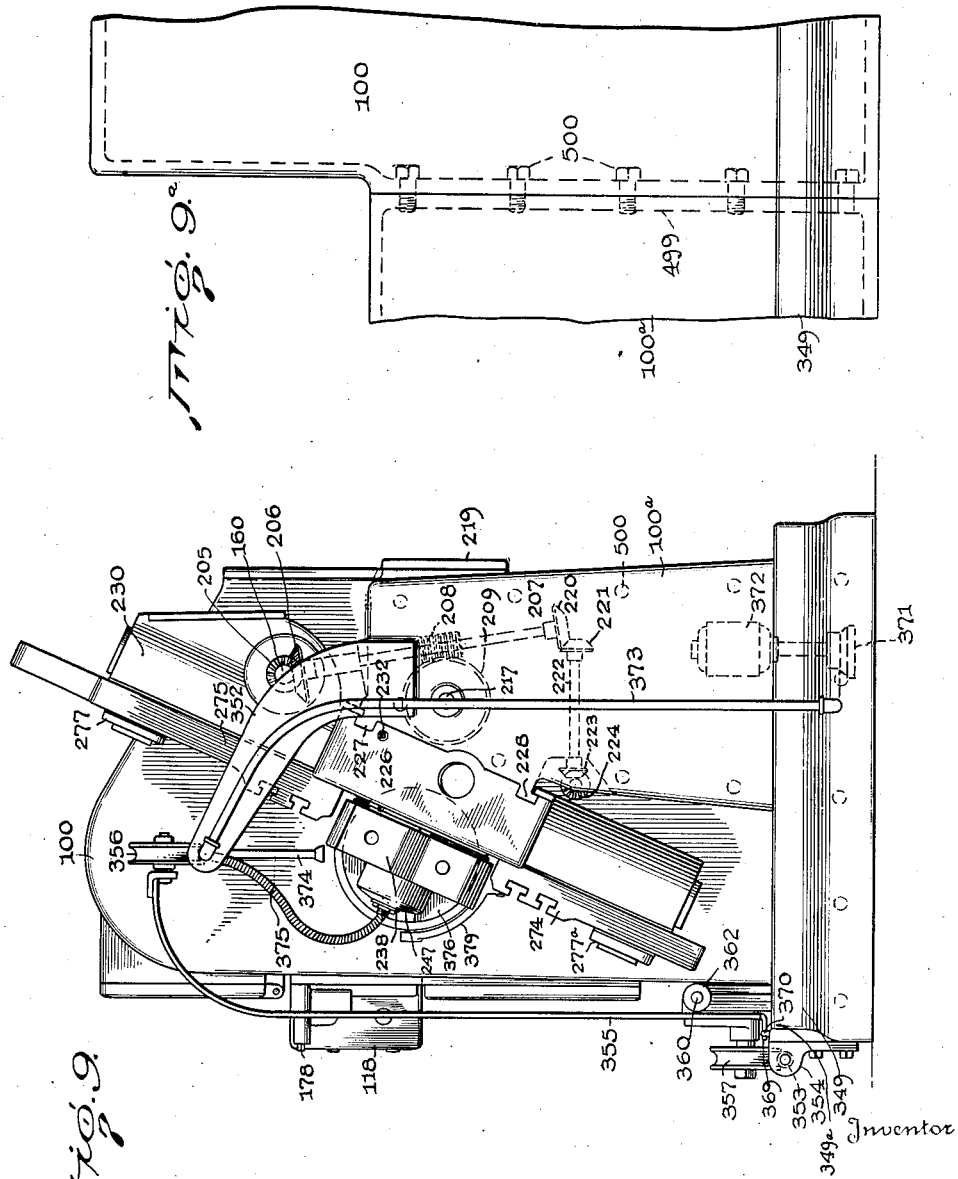

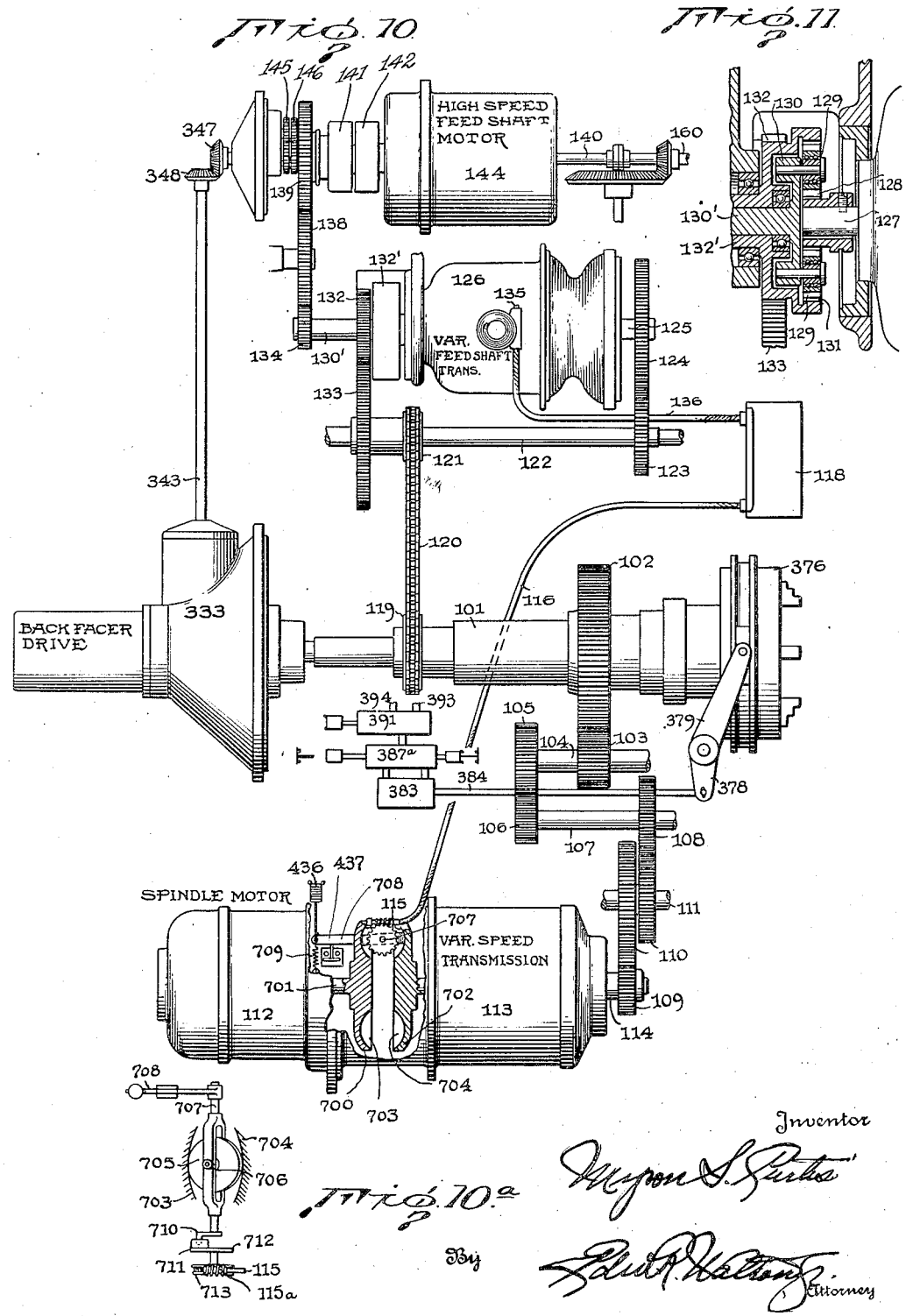

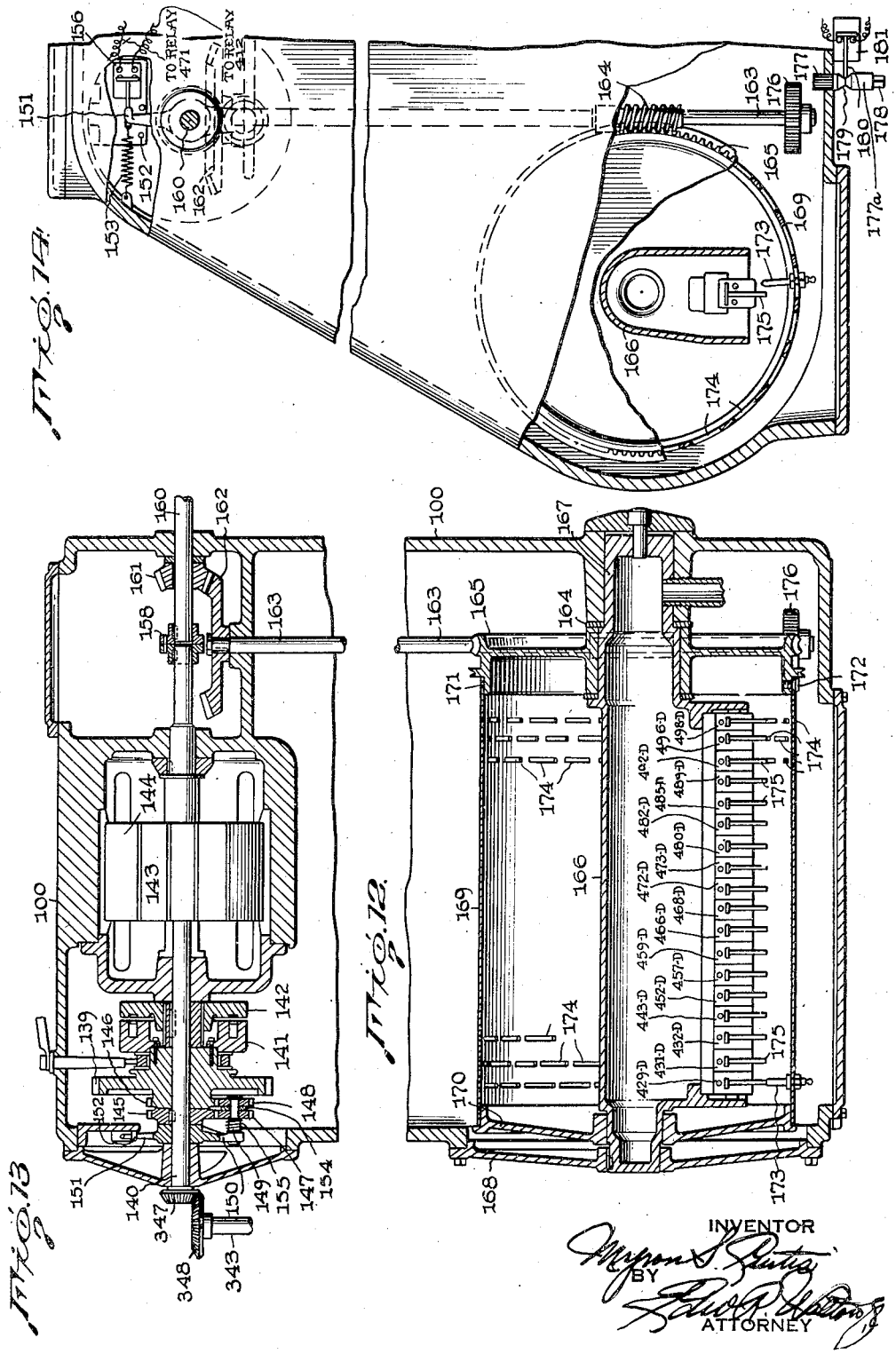

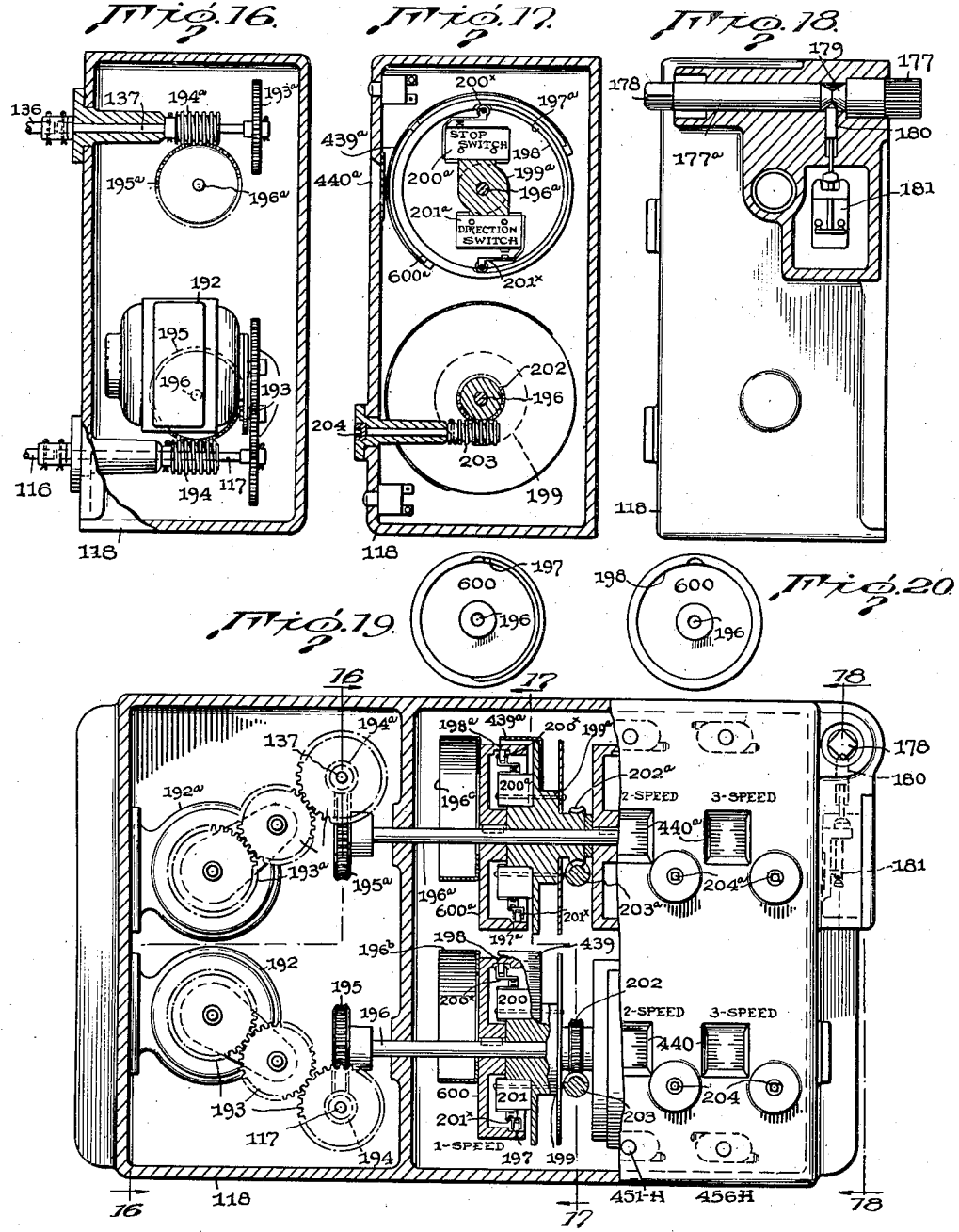

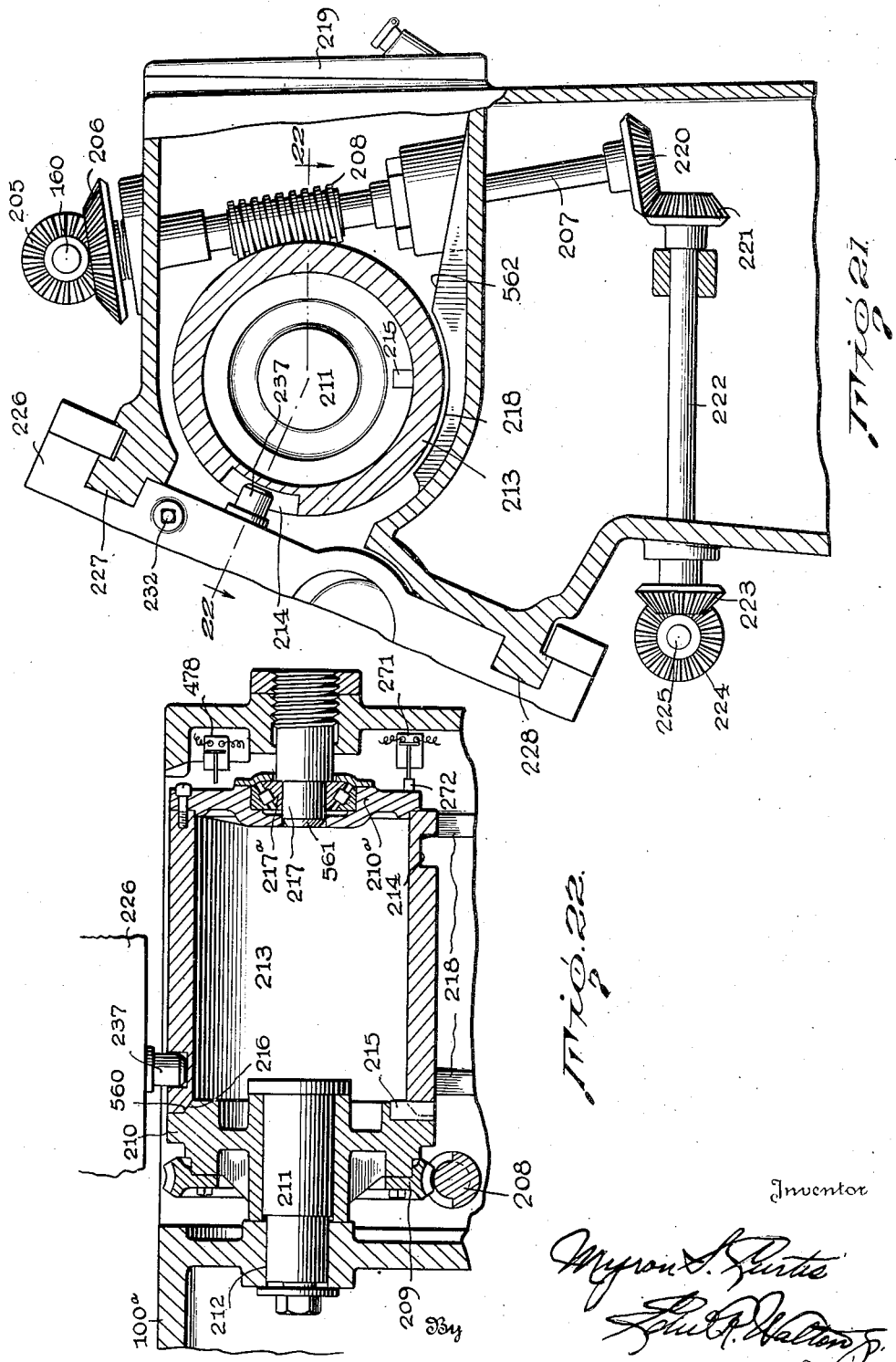

Sept. 9, 1941.  M. S. CURTIS  2,255,739
MACHINE TOOL
Filed June 8, 1938  13 Sheets-Sheet 9
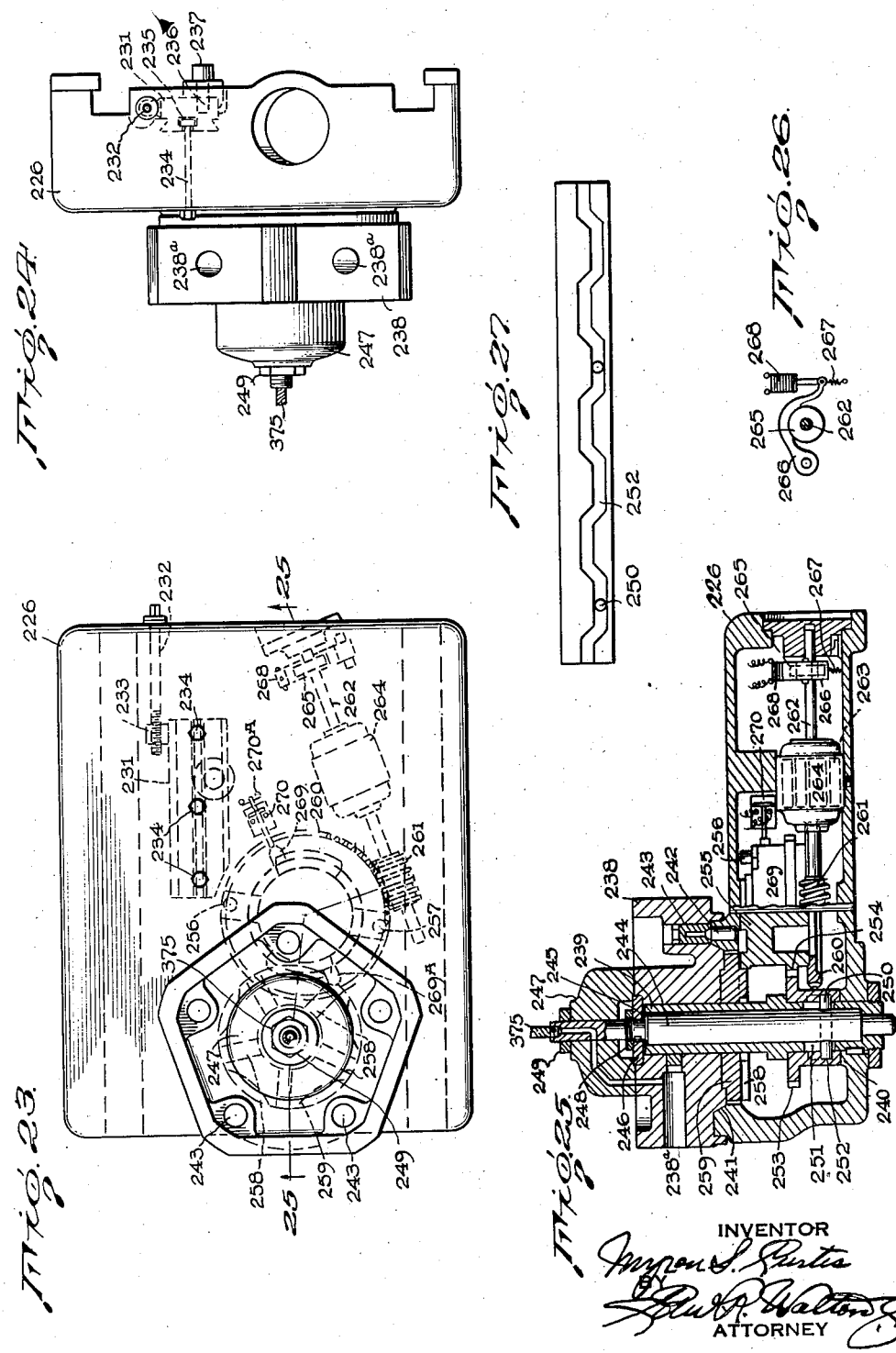

Sept. 9, 1941. M. S. CURTIS 2,255,739
MACHINE TOOL
Filed June 8, 1938 13 Sheets-Sheet 10
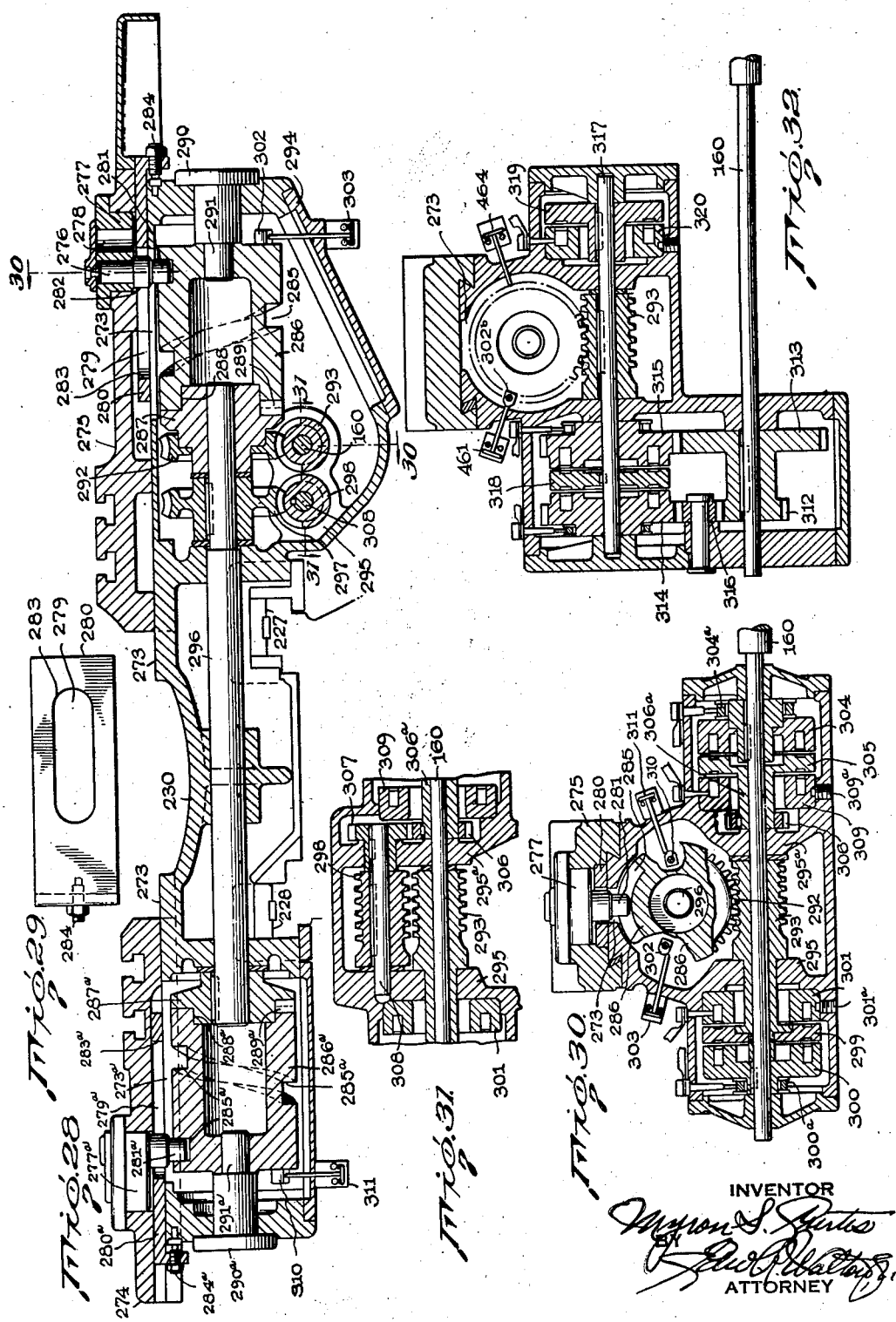

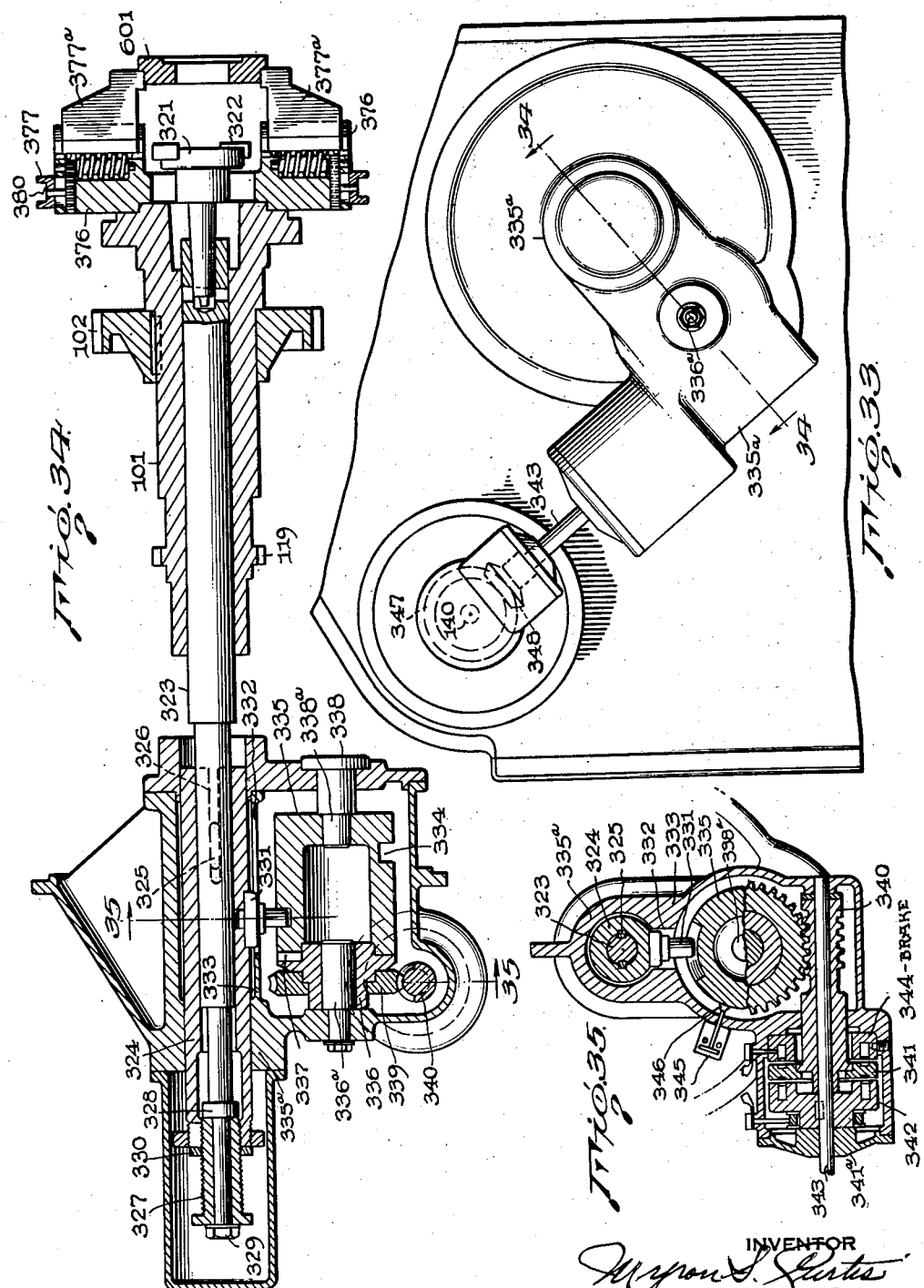

Sept. 9, 1941.  M. S. CURTIS  2,255,739
MACHINE TOOL
Filed June 8, 1938   13 Sheets-Sheet 12

INVENTOR
ATTORNEY

Sept. 9, 1941.　　　M. S. CURTIS　　　2,255,739
MACHINE TOOL
Filed June 8, 1938　　　13 Sheets-Sheet 13

Patented Sept. 9, 1941

2,255,739

UNITED STATES PATENT OFFICE 2,255,739

MACHINE TOOL

Myron S. Curtis, Pawtucket, R. I., assignor, by mesne assignments, to Potter & Johnston Machine Company, Pawtucket, R. I., a corporation of Rhode Island Application June 8, 1938, Serial No. 212,565

71 Claims. (Cl. 29—44)

The present invention relates to machine tools, particularly of the type where either the work or the tool, or both, is rotated.

In practically all machines of this type, there are two functions to be accomplished: First, the rotation of the tool or work: and, secondly, the feeding or movement of the tool and work with respect to each other. For the purpose of illustrating the invention herein, the principal detailed description refers particularly to where the work or work holder (hereinafter referred to as the spindle) rotates and where the tool holder or holders (hereinafter called the "slide") are moved with reference to the spindle for the purpose of doing work (this movement hereinafter called the "feed"), it being understood, however, that I do not limit myself to this adaptation as the spindle may carry the tools and the work fed thereto.

One of the objects of this invention is a centralized mechanism and control in one unit both for the rotation of the spindle and for the feeding of the tool, and which is hereinafter called the "Power Unit." This power unit is identical for all types of machines illustrated, and to this unit may be attached various other secondary units whereby the combined units either form a turret lathe, a center turning lathe, a single cut chucking machine, a boring or drilling machine, a milling machine, etc. For the above types of machines, the member which rotatably carries either the work or the tool is hereinafter called the "spindle." In a lathe this spindle will carry the work, but for a multiple spindle drilling and boring machine or a milling machine, the spindles will carry the tools. The member for feeding the work and tools with respect to each other is hereinafter called the "feed shaft." In the case of a lathe of any type this feed shaft operates the tool carrying member, whereas in the case of a multiple spindle drill, or milling machine, for example, it operates the work carrying member.

A further object is to provide an improved machine tool permitting wider range of use with a minimum cost, having greater efficiency in production of work and safety to both operator and the workpiece, having greater simplicity of construction and having complete automatic and manual control.

Briefly, some of the objects of the invention are more specifically stated as follows:

It is important that the spindle be rotatable at varying speeds, these speeds being preferably stepless within their limits, and they must be selectable either manually or automatically. It is also desirable that the spindle be stopped or started either manually or automatically.

The feed shaft should be driven by the spindle for all movements during which the tools are cutting so that the ratio between the feed shaft and the spindle remains constant and, if the speed of revolution of the spindle is changed, the feed per revolution of the spindle will remain constant.

It is, however, desirable that the ratio between the spindle and the feed shaft be changeable either manually or automatically, and it is furthermore desirable that this change of ratio be stepless within its limits.

For all idle movements of the feed shaft, i. e., movements during which the tools are brought to and from the work, it is desirable that these movements take place in the shortest possible time, therefore, at a quicker speed independent of the spindle.

It is further more necessary that all these various functions such as the changing of the spindle speed, the changing of the ratio of the feed to the spindle, the changing of the feed from its quicker speed idling movements to its feeding movements or vice versa, the stopping of the spindle for loading or unloading, the stopping and starting of the machine as a whole or such other functions as may be hereinafter described, be controlled either manually or automatically; and that it be possible to change from manual control to automatic control, or vice versa. It is also important that all of the various functions be interlocked so that they can only take place during their proper sequence. In view of the fact that many complex functions are involved these various controls are accomplished electrically, thus providing a simple and quick method of control without the use of levers, shafts, connecting rods, etc., which would be necessary if the control was mechanical.

Means are also provided for lubricating all necessary parts of the machine from one central pump unit; and as the spindle or the feed shaft may be running together or separately, the control of this lubricating unit by both the spindle and the feed shaft is provided, so that if either or both of these units are operating, the lubricating unit will be operating, and will cease from operation only when both units are stopped.

There is also provided a means for supplying cutting fluid compound or coolant to the work or cutting tools, and control this supply of lubricant either by hand or automatically.

Furthermore, simple means are employed for guarding the machine, and an automatic method of moving the guard to allow access to the work and tools.

Also means are employed for controlling a chuck both automatically and manually.

With the above and other objects in view, the invention is all that is shown and described and particularly pointed out in the appended claims, having reference to the special combination and organization of parts illustrated and described.

Referring in detail to the drawings which show the preferred embodiments of the invention as at present devised:

Fig. 1 is a front elevation of a turret lathe;

Fig. 2 is a front elevation of a single cut chucking lathe;

Fig. 3 is a front elevation of a center turning lathe;

Fig. 4 is a front elevation of a boring machine or multiple spindle drill;

Fig. 5 is a front elevation of a milling machine, in all of which the power unit is the same;

Fig. 7 is an end elevation of the power unit;

Fig. 8 is a rear elevation of Fig. 7, partially in section to illustrate the lubricant distributor of the power unit;

Fig. 9 is an end elevation of Fig. 6 from the turret end;

Fig. 9A is a detail showing one manner of attaching the secondary units to the common power unit;

Fig. 10 is a diagrammatical section through Fig. 7, on the line 10—10 thereof;

Fig. 10A is a plan elevation of the speed changing mechanism of the variable speed transmission 113 and 126.

Fig. 11 is an enlarged section of the differential in Fig. 10;

Fig. 12 is a cross-section through Fig. 7 on the line 12—12 and illustrating the control drum;

Fig. 13 is a section through Fig. 7 on the line 13—13 illustrating a portion of the feed shaft;

Fig. 14 is the end elevation of Figs. 12 and 13;

Fig. 15 is a front view partially in section of the pre-selector;

Fig. 16 is a transverse section taken on the line 16—16 of Fig. 15 showing the motor end of the preselector;

Fig. 17 is a section thru Fig. 15 approximately on the line 17—17;

Fig. 18 is a section thru Fig. 15 on the line 18—18;

Fig. 19 is a detail of the direction cam;

Fig. 20 is a detail of the positioning cam;

Fig. 21 is a section taken approximately on line 21—21 of Fig. 6 showing the mechanism for driving the turret and its slide;

Fig. 22 is a section taken on line 22—22 of Fig. 21;

Fig. 23 is a plan elevation of the turret and its slide;

Fig. 24 is an end elevation of Fig. 23;

Fig. 25 is a section thru Fig. 23 substantially on the line 25—25 thereof;

Fig. 26 is a detail of the brake for turret index motor;

Fig. 27 is a developed view of the binder cam for raising and lowering turret;

Fig. 28 is a section on the line 28—28 of Fig. 6 showing the cross-slides and mechanism for operating the same;

Fig. 29 is a detail elevation of one of the adjustable stops in cross slide feeding means;

Fig. 30 is a section taken approximately on the line 30—30 of Fig. 28 illustrating the magnetic clutches therefor;

Fig. 31 is a detail section approximately on the line 31—31 of Fig. 28;

Fig. 32 is a section of a modified means for driving the cross-slides;

Fig. 33 is an enlarged partial end elevation of Fig. 6 illustrating a backfacer actuating mechanism on one end of the power unit;

Fig. 34 is a section taken on line 34—34 of Fig. 33;

Fig. 35 is a section taken on line 35—35 of Fig. 34 and showing details of magnetic clutch for backfacer;

Figure 38:
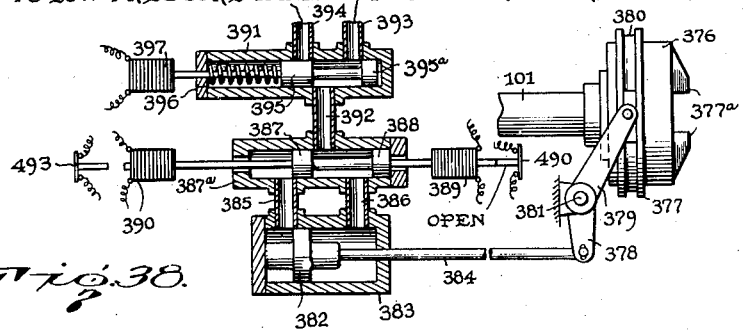

Fig. 38 is an elevation, partially in section, of a chuck and its operating mechanism; and Figs. 39 and 40 are diametric plan views of the bushing 277 of Figs. 28 and 30, said views showing the two positions of the bushing and its cam roll stud 276 after adjustment.

Throughout the specification and drawings, like characters of reference designate like and corresponding parts.

Referring in particular to Figs. 1 to 5, inclusive, a power unit 100 is diagrammatically shown which comprises a centralized mechanism containing, at least, a rotatable spindle 101 having a chucking device 376, means for actuating the spindle and the secondary units (to be attached or coupled to the power unit), and control means, manual and automatic, for both the spindle and the secondary units. These secondary units may be of various types; for instance, in Figure 1 is illustrated lathe unit 100ª which may be of the single tool slide or the turret slide type; in Figure 2 is illustrated a single-cut-chucking-lathe unit 100ᵇ; in Figure 3 is shown a center turning lathe unit 100ᶜ; in Figure 4 is shown a multiple spindle drill unit 100ᵈ; and in Figure 5 is shown a milling machine unit 100ᵉ, all of which may be interchangeably positioned in cooperative relation with a single power unit 100 and the part or parts thereof which cooperate with the spindle chuck 376 are operated and controlled from power unit 100 thru the feed shaft 160.

The units 100ª, 100ᵇ, 100ᶜ, 100ᵈ, and 100ᵉ each have a wall of its housing or frame 499 detachably connected by bolts or other fastener means 500 to a contiguous wall of the common power unit 100 (see Figs. 1 to 5, 6 and 9ª) so as to maintain the units in proper rigid and stationary position with respect to each other, the feed shaft 160 having a coupling 160ª by which the corresponding feed shaft of each secondary unit may be connected and disconnected to the feed shaft driving means of the power unit.

In describing the elements and functions of the invention, there will first be described the mechanical features and constructions, and then the electrical control and interlocking means.

POWER UNIT

Spindle drive

Figure 6:
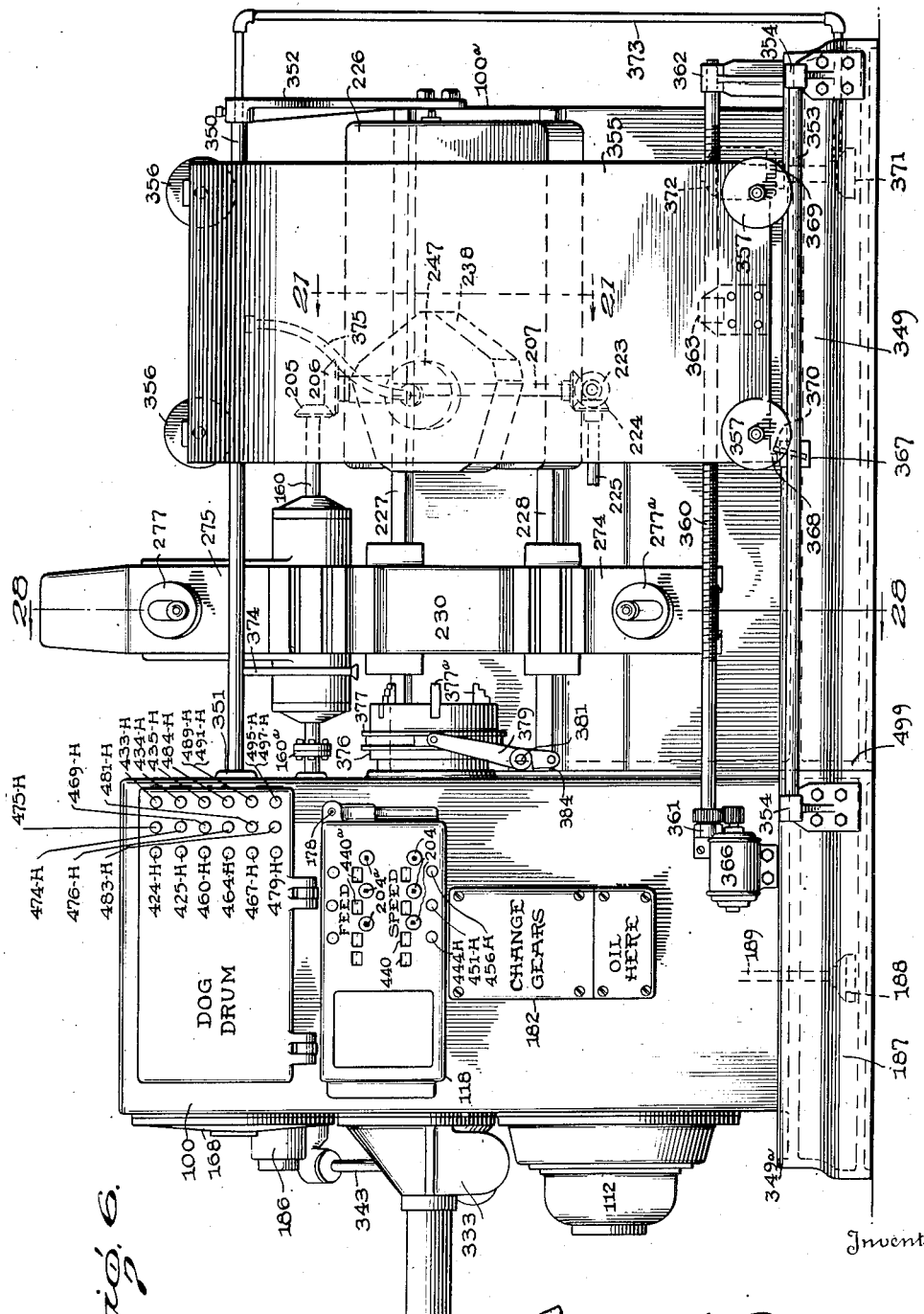
Fig. 6 is a front elevation more in detail of a turret lathe.

The power unit 100 has rotatably mounted therein, in suitable bearings, a spindle 101 to which is keyed gear 102 meshing with pinion 103 on shaft 104 (Figs. 6 and 10). Removably keyed to shaft 104 is a hand change gear 105 meshing with and driven by a hand change gear 106, removably keyed to shaft 107 (Figs. 7 and 10). Shaft 107 has keyed to it gear 108 which is driven by pinion 109 thru compound intermediate gears 110 revolving on stud 111. A motor 112 is attached to and drives an infinitely variable speed changing device 113 (Fig. 10), such as the New Departure Transitorq, and to the output shaft 114 of the variable speed device is keyed pinion 109. The motor 112 is a constant speed motor and the speed of the output shaft 114 of the variable speed transmission 113 may be varied infinitely throughout its range by rotating shaft 115. Shaft 115 is fastened thru flexible shaft 116 to shaft 117 of the preselector 118 (to be hereinafter described in connection with Figs. 15 to 20). Thus, it will be seen that the spindle 101 is driven by motor 112 thru the variable speed device 113, and the spindle speeds can be controlled and changed by the preselector 118.

Feed shaft drive

Referring to Figs. 7 and 10, it will be observed that keyed to spindle 101 is sprocket 119 which, thru chain 120, drives sprocket 121 keyed to shaft 122. Also keyed to shaft 122 is pinion 123 (Fig. 10) which meshes with and drives gear 124 keyed to the input shaft 125 of an infinitely variable speed change device 126. The output shaft 127 of this device 126 has keyed to it a pinion 128 (Fig. 11) which meshes with planetary pinions 129 rotatably supported in planetary carrier arm 130 on shaft 130' and which pinions 129 mesh with an internal ring gear 131 carried by housing 132'. The housing 132' also carries an external gear 132 meshing with and driven by pinion 133 keyed to the shaft 122. The shaft 130' has keyed to it a pinion 134 (Fig. 10). The gear ratios of this differential drive are such that while the variable speed transmission 126 has a 10-to-1 variation between the speed of the input shaft 125 and the output shaft 127, there is a variation of 30-to-1 between the speed of the input shaft 125 and the shaft 130' (carrying the gear 134) and the torque on the output shaft 127 of the variable is approximately ⅓ of the torque of the shaft 130' and its pinion 134.

The speeds of the variable transmission 126 may be varied infinitely thru its range by rotation of shaft 135 which shaft is connected by flexible shaft 136 with shaft 137 on the preselector 118. Therefore, the output speed of pinion 134 may be controlled and varied by the preselector 118 in a manner hereinafter to be described in connection with Figs. 15 to 20.

Through the mechanism just described, feed shaft 160 is actuated from the spindle 101 from pinion 134 thru intermediate gear 138 to drive gear 139 running loosely on shaft 140 (see Figs. 7, 10 and 13). Fastened to gear 139 is magnet 141 of a magnetic clutch, and keyed to shaft 140 is the armature 142 of this magnetic clutch, and when the magnet is de-energized gear 139 and magnet 141 revolve idly upon shaft 140. Also keyed to shaft 140 is the rotor 143 of a motor whose field 144 is fixed in housing 100, so that when motor 144 is energized shaft 140 is rotated at a high constant speed. When clutch 141 is energized and motor 144 is de-energized, shaft 140 is driven by and in synchronism with the spindle 101 for doing work. When clutch 141 is de-energized and motor 144 is energized, shaft 140 is driven at a high constant speed for idle movements and, when both are de-energized, shaft 140 remains stationary.

Differential switch

If shaft 140 is running at a high speed and gear 139 at a comparatively low speed, there would be a severe shock upon the engagement of clutch 141 due to the momentum of shaft 140. Therefore, means are provided for preventing the energizing of magnet 141 except when shaft 140 and gear 139 are running approximately at the same speed. Keyed to shaft 140 is a gear 145 and fastened to gear 139 is a gear 146, which mesh respectively with pinions 147 and 148 running loosely on stud 149 which stud is supported in arm 150 rotatably mounted on shaft 140. The end 151 of arm 150 is normally held against stop 152 by spring 153 (Figs. 13 and 14) when gears 145 and 146 are running at the same speed. Pinions 147 and 148 have between them a friction washer 154, and friction is applied between these gears by spring 155 on the stud 149. When gear 145 is revolving faster than gear 146 the friction between gears 147 and 148 tends to rotate arm 150 away from stop 152, and against the tension of spring 153 (Fig. 14), causing the end 151 of arm 150 to contact switch 156, closing the same and preventing the magnetic clutch 141 from being energized while shaft 140 and gear 139 are running at different speeds in a way hereinafter to be described.

Control drum

A shear pin coupling 158 has one-half thereof keyed to shaft 140 and the other half of the coupling keyed to feed shaft 160 whereby the latter is driven (Fig. 13). Also keyed to shaft 160 is a bevel pinion 161 meshing with and driving a bevel gear 162 keyed to shaft 163 which has integral with it a worm 164 meshing with worm gear 165 of the control drum 169 (Figs. 7, 13 and 14). This worm gear 165 is rotatably mounted on an electric switch carrier 166, which is preferably tubular to encase the electrical conductor as will be later apparent. The carrier 166 is fixed at one end in the power unit housing 100 by hub 167 and at its other end is supported by and keyed to plate 168 removably secured to power unit housing 100. A perforated sheet metal drum 169 has one end adapted to slip over a rabbet 171 of worm gear 165 and held thereon and driven by screw 172, while at its other end, adjacent the removable plate 168, is an internal spider 170 rotatably mounted on the carrier 166, whereby the drum 169 will rotate about the fixed carrier 166.

Dogs 173 may be inserted thru and fastened in the perforated slots 174 in drum 169 and when so inserted act upon switches 175, which are held in carrier 166, as the drum is rotated. The perforated slots 174 may extend in rows circumferentially of the drum 169, each slot in a row being spaced from the other and each being staggered with respect to the slots in adjacent rows along the whole length of the drum, and the switches 175 extend the whole length of the carrier 166. The ratio of gearing between shaft 160 and drum 169 is such that drum 169 makes one revolution for one cycle of the machine, and thru dogs 173 and switches 175 control automatically the various functions of the machine in a way hereinafter to be described.

With previous types of control drums, where the dogs are fastened on the outside and where the elements to be acted on by the dogs are also on the outside of the drum, adjustment of these dogs, particularly if a fine adjustment is required, becomes difficult due to the fact that the controlled element is between the operator and the dog. In the present construction, with the controlled elements inside the drum, there is nothing between the operator and the dog, and very fine adjustments can be made with ease. It may be also noted, that by removing plate 168 and screw 172, drum 169 and its attached plate 170 may be completely removed from the machine without disturbing any of the positions of the dogs. This is especially advantageous in the case of a complicated setup which must be repeated, because the drum 169 complete with its located dogs 173 may be kept intact for each setup, it then being only necessary to install the drum, thus eliminating the necessity for readjustment of a number of dogs.

Hand cranking

It may be desirable to rotate feed shaft 160 by hand for obvious purposes, and to this end is provided a gear 176 keyed to shaft 163, and therefore directly connected with shaft 160 (Figs. 6, 7, 13 and 14). A pinion 177 (see Figs. 14 and 18) is fast on a slidable shaft 177a, which has a squared end 178 to receive a wrench or crank handle, and may be pushed into mesh with gear 176 so that gear 162, and thereby shaft 160, may be rotated by pinion 177. When pinion 177 is thus placed in mesh with gear 176 a cam surface 179 on shaft 177a pushes rod 180 of switch 181 to open the latter and to prevent any power operation of shaft 160 while the pinion 177 is engaged with gear 176, switch 181 being normally biased to closed position.

Gear changing

It may be necessary to remove plate 182 (Figs. 6 and 7) to manually change gears 105 and 106. To obviate any danger to the operator from the inadvertent starting of the machine while changing gears 105 and 106, there is provided a switch 183 (Fig. 7) with a plunger 184 by which plate 182 closes switch 183, when the plate is in position, allowing current to be supplied to the motor 112, and opens switch 183 when plate 182 is removed, thus breaking the circuit through motor 112 (Fig. 36) in a way hereinafter to be described.

Lubrication

For lubricating the machine there is provided a pump 185 (Figs. 7 and 8) connected to and driven by motor 186. This pump sucks oil from sump 187 in the bottom of power unit housing 100 thru a strainer 188 and pipes 189 and delivers it thru pipe 190 to a distributor 191. From this distributor 191 the lubricant flows by gravity thru tubes to all necessary places, thence to sump 187 from which it is recirculated.

Speed and feed preselecting

As before mentioned, the variation in speed of the variable speed devices 113 and 126 (Fig. 10) is accomplished by rotating shafts 115 and 135 by shafts 117 and 137, respectively, in the preselector 118 (Figs. 6, 7, 15, 16 and 17) thru flexible shafts 116 and 136; and as the construction and operation is the same in both cases, only the changing of the speed of the spindle driving transmission 113 will be described and which is as follows:

Shaft 117 is driven by a reversible motor 192 thru gears 193 and therefore controls the drive of the variable speed transmission 113 thru flexible cable 116 connected to shaft 115. Also keyed to shaft 117 is worm 194 meshing with worm gear 195 keyed to shaft 196. Keyed to shaft 196 are sets of cams 197 and 198 (Figs. 15, 17, 19 and 20), there being three sets of speed changes shown in Figs. 6 and 15 and as many of said sets of cams as there may be speeds desired to preselect. The cams 197 and 198 are here illustrated (Figs. 15, 17, 19 and 20) as on the internal surface of a flanged disc 600. A switch carrier 199 is loosely mounted on shaft 196, and carries switches 200 and 201. Keyed to switch carrier 199 is a worm gear 202 meshing with worm 203, whose end extends thru the face of the preselector casing 118 and is squared or otherwise formed at its end 204 to receive a turning wrench. By thus manually rotating this worm 203, the position of the switch carrier 199 and its switches 200 and 201 can be adjusted or preselected. One of these switches 201 is a direction switch and the other switch 200 is a stop switch for rotation of motor 192, and consequently shaft 117 and 116. Therefore, upon energizing motor 192, either manually or automatically, cam 197 acting upon the roller on contact arm 201× of switch 201 will determine the preselected direction of rotation and cam 198 acting upon the roller on contact arm 200× of switch 200 will determine the preselected amount of rotation, in a manner hereinafter to be described under the heading "Hand and automatic operation" and the sub-heading "Speed transmission control."

TURRET TYPE MACHINE

One of the combinations of power unit and secondary units illustrated in detail is a turret lathe 100a, comprising a tool slide 226 (Figs. 1, 6, 9, 21, 22, 23, 24 and 25) and with which may cooperate a cross slide or slides 274 and 275 (Figs. 6, 9, 28 to 32) as well as a back-facer 321 (Figs. 33 to 35). The construction and operation of these parts of the secondary unit 100a will now be described, but will first describe the tool or turret slide and its movement to and from the spindle 101 or—more properly—its movement with respect to the spindle chuck 376, which holds the work.

Turret cam

To the feed shaft 160 is keyed a bevel pinion 205 meshing with a bevel gear 206 keyed to shaft 207 (Figs. 6 and 21). Integral with shaft 207 is a worm 208 meshing with and driving worm gear 209. The turret-slide cam may comprise a drum or cylinder 213 and having one end supported on a beveled rabbet 216 in an end member 210 to which it is removably keyed, as at 215. The end member 210 is rotatably mounted on a stud 211 fixed at 212 on machine frame 100a (Figs. 21 and 22) and preferably has worm gear 209 fast thereto by which the cam drum is driven through key 215. The other end of the drum 213 is provided with a thrust bearing cap 210a fixed thereto, mounted in which is a combination radial and thrust bearing 217a supported by a removable stud 217, which takes up the end thrust of the drum in one direction. When the stud 217 is removed, the drum 213 may be moved endwise sufficiently to allow it to clear rabbet 216. This end of the cam drum 213, which is supported by the end member 210, has a pronounced internal bevel 560 which engages a complemental beveled surface 216 on the end member 210. The stud 217 also has a pronounced external bevel end 561. The bottom of the drum compartment of the housing is so constructed or arranged as to form arcuate cradle surfaces 218, the radii of which are slightly larger than the radius of the drum 213 and the center of which is the same as the center of the studs 211 and 217. A runway 562, which may or may not be inclined, leads from door opening 219 (Fig. 21) in the outer wall of the housing to the cradle 218 and upon which the cam drum may be rolled into and out of the machine, the relation of the crade and runway being such that the drum will remain in the cradle until deliberately moved. The position of the cradle with respect to the centers of the stud 211 and 217 is such that, when the drum is in the cradle, it is approximately centered with respect to the end member 210 and the bearing 217ᵃ, so that when the stud 217 is inserted into its bearing 217ᵃ its chamfered or beveled end 561 will enter the opening of the bearing 217ᵃ and, upon further inward movement of the stud 217, the complemental bevel surfaces 560 and 216 will engage and cooperate to lift and center the adjacent end of the drum in the rabbet 216, and the other end of the drum will become properly supported on the stud 217.

Shaft 207 is provided with a bevel gear 220 meshing with a bevel gear 221 on shaft 222 and to the other end of which is affixed bevel gear 223 meshing with bevel pinion 224 on shaft 225; and thru shaft 225 power can be applied to various subsidiary slides, such as slide 225ᵃ, shown in center turning lathe 100ᶜ illustrated in Fig. 3.

*Turret slide*

A turret slide 226 is slidably supported on ways 227 and 228 (see Figs. 6, 9 and 21). These ways may be arranged parallel to each other and positioned to lie in a plane inclined to the horizontal, as may be particularly seen in Figs. 9 and 21. These ways also support the cross-slide base 230, which is adjustable along the length of the ways and also disposed in a plane at an angle with the vertical. By thus putting the cross slide and turret slide on an inclined angle various purposes are served. It first allows compound and chips to fall directly into the pan instead of remaining on the ways; secondly, it allows the operator much closer access to the work; thirdly, it allows the operator to adjust any tool on any turret face or on any cross slide from the one position while standing in front of the machine; and fourthly, it allows a convenient and easy way of guarding the machine as will be hereinafter described.

The turret slide 226 is provided with a subslide 231 (Figs. 23 and 24), adjustable longitudinally in slide 226 by screw 232 threaded in lug 233, and which may be clamped in its adjusted position by bolts 234 and clamps 235. Fixed on slide 231 is stud 236 carrying cam roll 237 which travels in cam path 214 on drum 213 (Figs. 21 and 22), and thus the slide 226 is moved to and from the spindle by the rotation of drum 213. Fine adjustment of the position of the slide 226 with respect to the work may be obtained by adjustment of the slide 231 by means of the adjusting screw 232.

A turret 238 is provided with the usual tool sockets 238ᵃ and has a central bore therein receiving hollow sleeve 239, keyed at its lower end in boss 240 of slide 226, by means of which it is rotatably mounted on the slide 226 (Fig. 25). Turret 238 is also provided with an annular tapered seat 241 which co-acts with a complemental seat in slide 226, thus providing a seat for the turret 238 on its outer face of the slide, when the turret is clamped in position. The rotation, or indexing, of the turret is upon sleeve 239 and, therefore, bearing 241 is not subject to wear from the rotation of the turret.

One or more locking pins 242 is fixed in the slide 226 at the turret seat 241 and projects beyond the surface thereof. In the seating surface of the turret 238 are a number of bushings 243 (the number of bushings corresponding with the number of faces of the turret) to co-act in sequence with pins 242 for locking the turret in its indexed position.

In order to index the turret, it is necessary to elevate it so that bushings 243 clear locking pins 242 and, after it has been indexed, to reseat the turret on seat 241 with locking pins 242 projecting into bushings 243. This is accomplished as follows:

A stud 244 is slidably, but not rotatably mounted in sleeve 239, and is reduced at its upper end to provide a shoulder 245. A washer 246 surrounds the reduced end of the stud 244 and has its periphery fixed in a groove in the turret 238. This washer may be clamped by a nut 248 threaded on reduced end of stud 244. When the stud 244 is raised, shoulder 245 engages the washer 246 and raises the turret. The cap 247 of the turret is firmly held in position shown on stud 244 by a nut 249 threaded on the extermity of said stud. Conversely, when stud 244 is lowered, nut 248 coacts thru washer 246 to return the turret to its seat 241. Also, stud 244 has a pin 250 transversely located in its lower end. The ends of the pin protrude thru slots 251 in sleeve 239 and are acted upon by cam path 252 in the hub of gear 253 journalled on the sleeve 239 and resting on the boss 240, whereby rotation of this gear 253 first raises stud 244 and then lowers it. The gear 253 meshes with and is driven by gear 254 on spider 255 which indexes the turret.

This spider 255 carries two Geneva arms 256 and 257, which by co-acting with the slots 258 in the Geneva plate 259 fastened to the turret 238 indexes the latter, there being two indexes for every revolution of spider 255. Fastened to spider 255 is a worm gear 260 driven by worm 261 on a shaft 262 keyed to armature 263 of a motor 264. When this motor is actuated, the turret 238 is first raised from its seat and from the locking pin, then indexed, and then pulled back into position. A disc 265 is also keyed to shaft 262, and with which a brake shoe 266 co-acts under impulse of spring 267 (Figs. 25 and 26). A solenoid 268, in parallel with the field of motor 264, is energized and releases the brake 266, when the motor is started, and spring 267 sets the brake when the motor is stopped.

The motor, and therefore the index movement, is started at any desired position manually by a push button 479H (Figs. 6 and 36) and/or automatically by a dog 272 on the slide drum 213 (Figs. 22 and 36), and the Geneva spider 255 by means of pins 269 and 269ᵃ co-acting with the normally closed switch 270 and 270ᵃ (Figs. 23 and 36) stops the motor after the Geneva plate has made one half revolution.

The indexing of turret preferably takes place at a certain position of the tool slide 226, and with the tool slide at rest. For accomplishing this, switches 271 and 478 (see Fig. 22) are provided with which a dog 272 on cam drum 213 co-acts, and by means of which the feed shaft 160 and the tool slide 226 are brought to rest in a manner hereinafter described.

Cross slide

As previously mentioned, the cross tool slide base 230 is mounted on the same ways 227 and 228 as is the tool slide 226 and also is adjustable longitudinally on said ways with respect to the work (Figs. 6, 9, 28-31). The base 230 has guide ways 273 longitudinally thereof and on which are slidably mounted front cross slide 274 and rear cross slide 275. The rear end of the cross tool slide 275 has a bushing 277 rotatably mounted thereon carrying a stud 276 disposed off center so that when bushing 277 is rotated 180° from the position shown in Figs. 28 and 39 to the position shown in Fig. 40 a certain amount of adjustment of its cam roll 281 with respect to the slide 275 is obtained. It will thus be seen that as a result of such adjustment the cam roll stud 276 is still in a vertical plane through the axis of the cam drum 286 but the distance "A" to the end of the slide is changed (see Figs. 39 and 40). Bushing 277 has also another opening 278 therein off center with less degree and in which the stud 276 may be inserted to obtain two other variations in the distance "A". Cam roll stud 276 protrudes thru a slot 279 in a plate 280 and, when the cam roll 281 is in its forward position, the shoulder 282 of the stud 276 abuts against edge 283 of plate 280, thus forming a stop, plate 280 being adjustable by screw 284. The cam roll 281 co-acts with cam path 285 in cam drum 286, one end of which is supported in rabbet 288 on spider 287 and is driven thru key 289. The other end of the drum is supported by plug 290 having stud shaft 291 on which the drum is journalled, and upon the removal of this plug 290 the drum may be slipped rearwardly until withdrawn from the keyed rabbet 288 and cleared from spider 287, and then removed thru opening covered by plate 294. Spider 287 is loose on the shaft 296 and has fastened to it worm gear 292 driven by worm 293 mounted loosely on feed shaft 160.

In the same manner as above the cross slide 274 is moved by cam path 285ª in a drum 286ª which in turn is driven by spider 287ª keyed to the shaft 296, on the other end of which (adjacent the worm gear 292) is keyed worm gear 297 driven by worm 298.

Worms 293 and 298 are positioned side-by-side for compactness and convenience and are carried on shafts 160 and 308, respectively, journalled on bearings 295 and 295ª on the cross slide base 230 (Figs. 28, 30 and 31). Each of said worms has a bore therethru. The worm 293 has the tool slide feed shaft 160 extending free thru its bore and one end journalled in the bearings 295 and extending beyond the same. An armature 299 of a magnetic clutch is splined to said extending end of the worm 293 and a magnet 300 is keyed to shaft 160 on one side of the armature. A braking magnet 301 is disposed on the other side of the armature and held stationary by set-screw 301ª. One or other of these magnets is always energized so that worm 293 is always either frictionally connected to tool slide feed shaft 160 or to stationary brake magnet 301, whereby it is frictionally braked. Magnet 300 is energized either manually by a push button or automatically by a dog on the control drum 169 and, when so energized, brake magnet 301 is de-energized and slide 275 is driven from shaft 160. When drum 286 has been thus rotated to a desired degree, the adjustable dog 302 on drum 286 actuates switch 303 to de-energize the driving magnet 300 and to energize the brake magnet 301.

There may be a number of similar slide operating drums driven from feed shaft 160 and these drums must be kept in synchronism with each other and with the control drum 169, which is positively geared to shaft 160 and which makes one revolution to a cycle of the machine. To accomplish this synchronism it is necessary that each drum be started from the control drum 169 and stopped by itself, this procedure correcting any nonsynchronization which might take place thru slippage between magnet 300 and armature 299.

In a like manner worm 298, which is keyed to shaft 308, is driven from feed shaft 160. To this end, gear 307 is keyed to shaft 308 and meshes with gear 306 fast on an end of a hollow or sleeve shaft 306ª rotatably surrounding feed shaft 160. The other end of the sleeve 306ª has fast thereon a disc armature 305 of a magnetic clutch comprising stationary disc magnet 309 disposed between the armature 305 and the gear 306 and held fast to the cross slide base by plug 309ª. A disc magnet 304 keyed to feed shaft 160 and disposed on the other side of the armature 305 is supplied with electric current thru the sliding ring contact 304ª. The worm 298 may be held stationary by the stationary brake magnet 309 thru the above mentioned connections. Dog 310 and switch 311 (Fig. 28) operate to stop the drum 286ª in the same way as hereinbefore described with respect to drum 286.

As hereinbefore described, the drums 286 and 286ª always revolve in one direction in relation to shaft 160. It may be desirable to reverse the direction of these drums in respect to feed shaft 160 and this may be accomplished by the means shown in Fig. 32 where gears 312 and 313 keyed to shaft 160 drive respectively magnets 314 and 315, each provided with gear teeth and loose on shaft 317 to which worm 293 is keyed. The gear 312 drives magnet 314 thru intermediate pinion 316, and thus magnets 314 and 315 revolve in opposite directions in relation to feed shaft 160. Between the magnets 314 and 315 is disposed an armature 318 keyed to shaft 317 and may be frictionally driven by either magnet 314 or 315 upon the energizing of either of them. In order to hold the shaft 317 and its worm 293 stationary an armature 319 is keyed to shaft 317 and may frictionally engage with the stationary brake magnet 320. Therefore, worm 293 may be driven in either direction from shaft 160, or held stationary by magnet 320. In the case of the reverse cam drum (Fig. 32), as well as in the uni-direction cam drum (Fig. 28), the drive connection from feed shaft 160 is established by dogs on the control drum 169 and/or is disconnected from shaft 160, and stopped by brake magnet 320, when switches 461 and 464 are actuated by dog 302ᵇ on the cross-slide drum itself. The manner of controlling these slides will be hereinafter described.

Backfacer

As mentioned above, there may be a number of similar slide operating drums driven from the feed shaft 160, and one of these may take the form of a backfacer, or tool carrier, operating thru the spindle to perform work upon the face nearest the spindle of the subject or workpiece. This backfacer may consist of a supplementary tool carrier 321 bearing tools 322 disposed in a chamber or central opening in the work chuck 376 (see Figs. 33, 34 and 35) and fastened to one end of a bar 323 slidably mounted in spindle 101. The other end of the bar 323 is slidably mounted in a sleeve 324 which in turn is slidably mounted in a housing 335ª supported on the casing of the power unit 100. Bar 323 is slidably operated by a cam drum 335 actuated thru suitable mechanism from the shaft 140 (Figs. 6, 7, 10, 13, 33, 34, 35) and kept from turning in sleeve 324 by key 325 coacting with spline 326, but may be longitudinally adjusted in the sleeve 324 by bushing 327 threaded in outer end of sleeve 324 (Fig. 34). One end of the bushing 327 coacts with a collar 328 on rod 323, and the other end of bushing coacts with nut 329 on rod 323, so that by turning bushing 327 in or out of the end of the sleeve 324, rod 323 may be adjusted with relation to sleeve 324 and, when so adjusted, may be securely clamped in place by nut 329 and lock nut 330 externally threaded on bushing 327. Sleeve 324 is provided with a cam roll 331 passing thru slot 332 in bracket 333, on the housing 335ª which prevents the sleeve 324, and hence rod 323, from rotating. Cam roll 331 coacts with cam path 334 in cam drum 335. One end of this drum is supported by spider 336 rotatably mounted on stud 336ª supported on one wall of the housing 335ª and is keyed to the spider at 337, while the other end of the drum is journaled on a stud shaft 338ª supported by removable plug 338 in an opposite wall of housing 335ª. By the removal of this plug 338, the drum 335 may be removed from its housing. The spider 336 also has keyed to it a worm gear 339 meshing with and driven by worm 340.

The means of driving worm 340, and hence drum 335, is the same as with the worm 293 and drum 286 of cross slide 273. Thus to worm 340 is splined an armature 341 of the magnetic clutch (Fig. 35), which may be frictionally engaged with rotatable disc magnet 342 keyed to and driven by shaft 343 upon the energizing of this magnet, or may be frictionally engaged with stationary disc brake magnet 344 upon its energization. As in the case of the cross slide 273, magnet 342 may be energized and magnet 344 de-energized by a switch operated either manually or automatically by the control drum 169 and, when so energized, drum 335 is operated by shaft 343 which is driven from feed shaft 140 thru mitre gears 347 and 348 (Figs. 6, 7, 10, 13, 33 and 35). Magnet 342 is de-energized and magnet 344 is energized by switch 345 by dog 346 on drum 335 as hereinafter more fully described.

Chip guard

By placing the tool or turret slide 226 and the cross slide base 230 on an acute angle to the horizontal, and thus keeping all parts from protruding over the edge 349ª of the base pan 349 (Figs. 6 and 9), I provide an improved and very convenient construction and one permitting the ready attachment and operation of the improved splash guards of this invention.

A hollow tubular track bar 350 extends horizontally from a bearing 351 at upper portion of the power unit 100 to bracket 352 clamped to the end wall of the frame of the unit 100ª. The tube 350 is positioned well above the chuck 376. A second track bar 353 is held in suitable brackets 354 on the front face of the base pan 349 of the slide unit 100ª. A chip guard 355 is supported on bar 350 by grooved wheels 356 and on bar 353 by groove wheels 357 and is thus slideable longitudinally of said bars. The chip guard 355 is preferably of one piece of material extending vertically upward from the track 353 and having its upper end portion curved inwardly of the machine to the track 350 in order to substantially cover the slides and chucks when in operative position, it being understood that it will be of the desired width for this purpose.

The guard 355 is operated to covering and uncovering positions by a motor 366 operatively connected to a screw feed rod 360 supported in bearings 361 and 362 and passing thru an internally threaded bore in a lug 363 on the guard 355, so that rotation of the screw 360 in the one direction moves the guard towards the chuck and rotation in the other direction moves it away from the chuck.

A double throw switch 367 is fastened to the frame of the machine in the path of movement of dogs 368 and 369 on the guard 355 and which dogs coact with the trip finger 370 of the switch and thus regulate the direction of rotation of the motor 366. For example, when the guard is in its uncovering position, as shown in Fig. 6, dog 368 operates switch 367 to stop motor 366 and to change its direction of the rotation so that, when it is again started (thru other means), the guard 355 will be moved in the direction toward the chuck and at the end of its travel, dog 369 will throw switch 367 to stop motor 366 and reverse its direction so that the next time the motor is operated, the guard will move in the direction away from the chuck.

Motor 366 may be started either by a hand push button or automatically by a dog on the control drum 169 in a way hereinafter to be described.

Cutting lubricant

While the various tools operate on the work it is necessary to supply a cutting lubricant to the surfaces and tools. The base 349 of the slide unit provides a sump in which such cutting lubricant is contained. A pump 371 is located in the sump 349 of the unit 100ª (Fig. 9) and is driven by motor 372. Motor 372 may be either started or stopped by hand or automatically by a dog on the control drum 169. The cutting lubricant is delivered from pump 371 thru pipe 373 to the end of the tubular guard track 350, (thus performing two functions) from which the coolant is distributed to various parts of the machine, for example, to the chuck by means of outlet 374 (Fig. 6), or to the tool holding sockets 238ª of the turret 238 by flexible outlet 375 (Figs. 6, 9 and 25).

Chuck

For holding the work piece or material 601 to be operated upon, or in some instance the tool, in the spindle 101, a chuck 376, of a well known type, is attached to an end of the rotatable spindle projecting thru the wall of power unit 100 to which the other complementary units 100ª, 100ᵇ, 100ᶜ, 100ᵈ etc., are interchangeably attachable (Figs. 1–6, 10, 34 and 43). Such chucks may be provided with a slidable annulus or ring 377 having an annular groove 380 to receive the end of a yoke 379 mounted on shaft 381 having a lever arm 378. When ring 377 is moved in one direction it opens the chuck jaws 377ª, and in the other direction closes the chuck jaws. The arm 378 is rocked by piston 382 in cylinder 383 thru a connecting rod 384. Either side of the piston may be connected to the source of pressure, compressed air for example, or may be exhausted to the atmosphere through pipes 385 and 386, and valve chest 378—A, under control of piston-type valves 387 and 388, and depending on the position of these valves which are connected together and operated in one direction by solenoid 389 and in the other by solenoid 390. In the position illustrated, solenoid 389 has moved piston valve 388 to its extreme right hand position, at which time pressure is applied to one side of the piston valve thru pipe 386, and the other piston valve 387 has opened pipe 385 to the atmosphere. When solenoid 390 is energized, the opposite takes place.

It may be desired to have a lesser pressure exerted upon the chuck jaws for finishing operations and the like; and therefore a second valve 391, preferably of the piston type, is interposed between the valves 387 and 388 and high and low pressure supply sources (not shown), high pressure being delivered to the valve chest or casing 391 thru pipe 393 and the lower pressure thru pipe 394. A piston 395 is normally held by spring 396 in the position shown in Fig. 38, closing the low pressure supply and admitting high pressure from pipe 393 to valve chest 387$^a$. When solenoid 397 is energized, the piston 395$^a$ is moved to close the high pressure delivery to valve chest 391 and admit low pressure from supply pipe 394, which is likewise delivered to valve chest 387$^a$ thru pipe 392. Solenoids 389, 390 and 397 are controlled either manually or automatically as hereinafter described.

ELECTRICAL CONTROL

Figure 36:
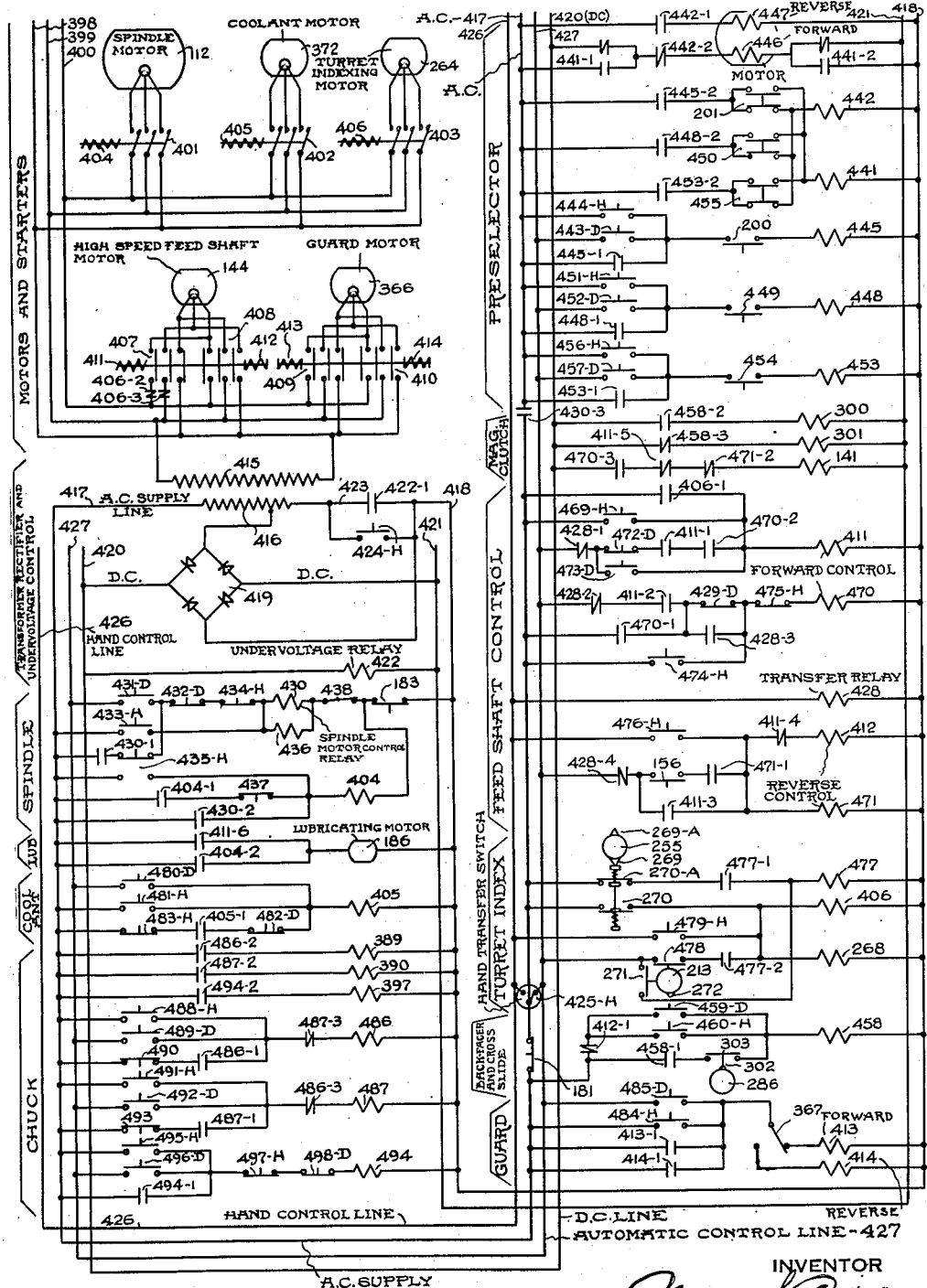
Fig. 36 is a wiring diagram for the machine and its controls.
Figure 37:
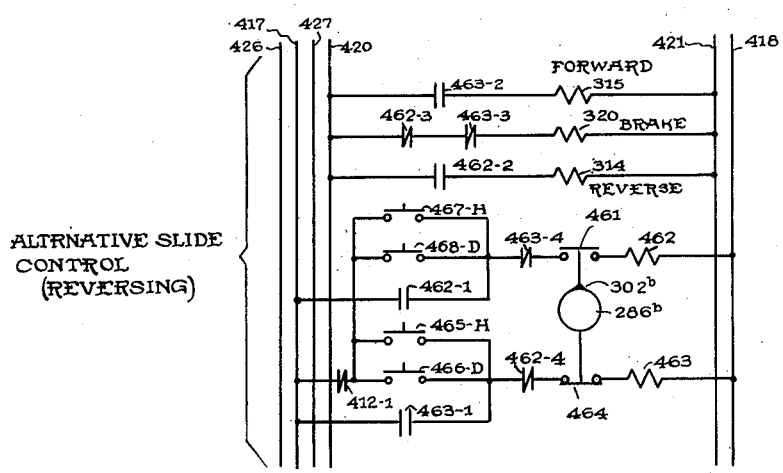
Fig. 37 is a wiring diagram for the modified or alternative cross-slide drive illustrated in Fig. 32.

The electrical drive and control of the combined lathe machine, as shown in Figs. 1, 6 to 35 and 38 is illustrated in Figs. 36 and 37. For the purpose of simplification this control is shown diagrammatically, it being understood that such a diagrammatical drawing is clear to one familiar with the art; and, for the purpose of clarification, the circuits are bracketed according to the functions which they perform. Also, for clarification, the various interlocks or switches operated by relays have the relay number with a sub-numeral; all hand-operated switches are sub-lettered H, and all control drum operated switches are sublettered D.

For convenience, the circuits and the various switches, interlocks and relays therein will first be described with reference to the various instrumentalities they control or which control them, and then a description of their sequence of operation will follow.

It is to be understood that the control drum operated switches (Figs. 12 and 36) for automatic control of the machine are in the automatic AC circuit 427—418 and are operative only when the electric circuits are in automatic control condition through the transfer switch 425—H (Figs. 6 and 36) but the hand operated switches (Figs. 6 and 36), with the exception of 476—H and 479—H, are in the main AC supply circuit 417—418 and are thus operative whether the electric circuits are in either hand or automatic control. Switches 476—H and 479—H are in the hand control circuit 426—418 and are thus operable only when switch 425—H is in the hand control position. Thus all of the functions of the machine are separately under full manual control of the operator at all times. Also it is to be noted that the operation of the machine may be manually stopped at all times, irrespective of the condition of control, by the manually operated switches 434—H and 475—H which are disposed adjacent to each other on the panel shown on Fig. 6 to be conveniently depressed by the operator. Switch 434—H cuts off operation of the spindle motor 112 which stops the spindle, and as the slide feed shaft and its attached drums are driven from the spindle when on the feeding cycle, it also stops the slide feed shaft and drums under this condition. Switch 475—H stops the high speed feed shaft motor 144, which motor drives the slide feed shaft and its drums when on the fast idle cycle.

The commonest form of electrical current used is 3 phase alternating and, in the diagram Fig. 36, the numerals 398, 399 and 400 represent the three line conductors which may be of any voltage, such as that taken from a commercial electrical supply line. The spindle motor 112 (Figs. 6 and 10), the coolant motor 372 (Fig. 9), and the index motor 264 (Figs. 23 and 25), which are unidirectional, take their current from the main line through switches 401, 402 and 403 respectively. These switches are operated by relays 404, 405 and 406, respectively.

The high speed feed shaft motor 144 (Figs. 10 and 13), operating the feed shaft during idle movements of the slides, and the guard motor 366 (Fig. 6) are reversing motors and take their current from the line through the reversing switches 407—408 and 409—410, respectively. The forward switch 407 of the motor 144 is controlled by the relay 411 and the reverse switch 408 by relay 412. The forward switch 409 of the motor 366 is controlled by the relay 413 and the reverse switch 410 by relay 414 (see upper left hand corner of Fig. 36).

As has been hereinbefore stated, the line voltage may be of any voltage. It is preferable to have the control voltage for operating all relays constant regardless of the line voltage and at a comparatively low voltage to obviate accidents. Therefore the primary coil 415 of a transformer is connected across the main line, and the secondary coil 416 of the transformer furnishes a constant AC voltage for the control circuit through wires 417 and 418. For certain functions of the machine requiring direct current, a rectifier 419 connected to the secondary coil 416 and conductor 418, is employed and supplies DC current to conductors 420 and 421.

A fractional horse-power motor 186 (Figs. 6, 7, 8 and 36) for driving the lubricating pump 185 receives its current from the AC supply line 417 and 418; and the preselector motor 192 (of the "shaded pole type," namely with a coil 446 for forward rotation and a coil 447 for reverse rotation), also receives its current directly from the AC supply line 417 and 418. The forward coil 446 of the preselector motor 192 may be energized with direct current for braking purposes from the DC lines 420 and 421.

The slide feed shaft magnetic clutch 141, the cross-slide magnetic clutches 300 and 304, the cross-slide brake magnets 301 and 309, the back-facer clutch magnet 342 and the back-facer brake magnet 344, are supplied with DC current from the DC line 420 and 421, and as the operation of the said cross-slide and brake-facer clutches and brakes are identical with each other, only one magnetic clutch 300 and one magnetic brake 301 are illustrated in the wiring diagram (Fig. 36). Similarly, clutch magnets 314 and 315 and brake magnet 320 of the alternate cross-slide construction, shown in Fig. 32 and the wiring diagram of which is shown in Fig. 37, are supplied with DC current from the DC lines 420 and 421.

If, for any reason, the voltage of the various lines drop so low that the relays will not operate or the supply of current to the machine is shut off, it would be dangerous to have the machine start operating again automatically upon the restoration of voltage. Therefore, an undervoltage relay 422 is shunted across the DC lines 420 and 421 and has an interlock 422—1 in the AC line 423 coming from the transformer which furnishes current to both the 110 volt control AC circuit and the DC rectifier 419. Since the DC voltage is dependent upon the AC line voltage, a drop in the AC line voltage will cause a corresponding drop in the DC voltage, in which case the relay 422 will fall out opening interlock 422—1 in the AC conductor 423, thus breaking both the 110 volt AC supply circuit and the DC operating circuit. Failure of the rectifier 419 will also cause the relay 422 to fall out giving the same results just mentioned. As the line 423 furnishing current to the rectifier 419 is now broken by the interlock 422—1, restoration of the voltage to the line 423 will not operate relay 422 until reset button 424—H is pressed restoring the voltage to the rectifier, resulting in energizing relay 422 which then operates closing the holding circuit of the AC supply line through interlock 422—1.

For operating the various motor switches, magnetic clutch switches and interlocking switches (which latter control the interrelation of the various functions of machine), there is provided a number of solenoid operated switches. These switches each may comprise a solenoid or relay (hereinafter called "relay"), which when energized opens or closes one or more switches, these switches being hereinafter called "interlocks". As has been stated, the various interlocks controlled by any one relay bear the numeral of that relay with a sub-numeral. These relays receive AC current from the supply line 417 and 418 through either the hand control circuit 426 or the automatic control circuit 427 depending upon the position of the transfer switch 425—H.

The motor switch operating relays 404, 405, 406, 411, 412, 413 and 414, shown in the upper left hand corner of Fig. 36 in association with their respective motors, are further duplicated in their respective circuits at other places shown in the diagram opposite the legion bracketed portions of the diagram in order that a clear understanding of the circuit hook-ups can be had.

A description of the functions of these various relays and their interlocks follows:

Transfer relay 428 controls transfer from hand to automatic operation, and, when it is energized by throwing hand transfer switch 425—H to connect supply line 417 with hand control line 426, it opens interlocks 428—1, 428—2, 428—4 breaking the automatic control circuit to the relays 411, 470, 412 and 471 and closes interlock 428—3, shunting automatic stop dog 429—D out of operation, whereby preventing all automatic operation of feed shaft 160.

Spindle control relay 430 is energized either by dog switch 431—D, when hand transfer switch 425—H is in automatic control (as shown), or by hand switch 433—H, when hand transfer switch 425—H is in either hand or automatic control, and may be de-energized by either switches 432—D or 434—H. When energized, relay 430 closes holding circuit interlock 430—1, spindle motor starting interlock 430—2 and interlock 430—3 (in line 417—preselector bracket) energizing the pre-selector circuit, which latter is only rendered operable when spindle motor 112 is running.

Spindle motor relay 404 is energized either by interlock 430—2, as just mentioned, or by the double contact hand push-button 435—H. When energized, relay 404 closes line switch 401 of motor 112, closes holding circuit interlock 404—1, and closes interlock 404—2 for starting the lubricating motor 186.

Coolant-motor relay 405 may be energized automatically by switch 480—D or manually by switch 481—H and, when energized, it closes switch 402 of the coolant motor 372 and closes holding circuit interlock 405—1.

Chuck-opening relay 486 may be energized manually by push-button 488—H or automatically by drum switch 489—D and, when energized, it closes holding circuit interlock 486—1, closes interlock 486—2, thus energizing piston-valve solenoid 389, and opens interlock 486—3 preventing the operation of relay 487.

The chuck-closing relay 487 may be energized manually by push-button 491—H or automatically by the control drum through drum switch 492—D. When so energized, relay 487 closes holding circuit interlock 487—1, closes interlock 487—2 thus energizing piston-valve solenoid 390, and opens interlock 487—3 thus preventing the energizing of chuck-opening relay 486. Chuck-relief relay 494 may be energized manually by push-button switch 495—H or automatically by control drum operated switch 496—D, and, when so energized, it closes holding circuit interlock 494—1 and interlock 494—2, thus energizing piston-valve solenoid 397 (see Figs. 36 and 38).

Relay 441, which controls the forward coil 446 of the pre-selector motor 192, may be energized by either interlock 445—2, 448—2 or 453—2. When so energized, it operates the double interlocks 441—1 and 441—2, closing the AC circuit through forward coil 446 of motor 192 and opening the DC circuit through said coil 446.

Relay 442, which controls the reverse coil 447 of the pre-selector motor 192, may be energized by interlocks 445—2, 448—2 or 453—2, and when so energized, closes interlock 442—1, completing the AC circuit through reverse motor coil 447 and opens interlock 442—2, thus cutting out all current to the forward coil 446 of motor 192.

Relay 445 may be energized manually by push-button switch 444—H or automatically by control drum switch 443—D, and when so energized closes holding circuit interlock 445—1, closes interlock 445—2; thus energizing either the forward-coil motor relay 441 or the reverse-coil motor relay 442 depending upon the position of the limit switch 201 of No. 1 speed operated by cam 197 on the pre-selector shaft 196 (see Figures 15 and 17).

Relay 448 may be energized manually by push-button switch 451—H or automatically by control drum switch 452—D. When so energized it closes holding circuit 448—1 and interlock 448—2, which in turn energizes either relay 441 or relay 442, depending upon the position of a pre-selector cam operated switch 450 of No. 2 speed.

Relay 453 may be manually energized by push-button switch 456—H or automatically by control drum operated switch 457—D. When so energized it closes holding circuit interlock 453—1 and closes interlock 453—2 thus energizing either relay 441 or relay 442 depending upon the position of a pre-selector cam operated switch 455 of No. 3 speed.

Relay 411 of the feed shaft motor may be manually energized by hand push-button 469—H, or automatically by control drum operated switch 473—D or by interlock 406—1 (shown in feed shaft control bracket in Fig. 36), the latter interlock being actuated by the relay 406 of the index motor switch 403. When so energized, the relay 411 closes the forward rotation switch 407 of high speed feed shaft motor 144; closes holding circuit interlock 411—1; closes interlock 411—2, thus energizing relay 470 which controls current to the feed shaft clutch magnet 141 (Figure 13); closes interlock 411—3 which energizes differential relay 471 (which is further controlled by switch 156—see Figs. 14 and 36); opens interlock 411—4 preventing the energization of relay 412 which actuates the reverse switch 408 of motor 144; opens interlock 411—5 thus breaking the DC circuit through the feed shaft clutch magnet 141, and closes interlock 411—6 thus supplying current to the lubricating motor 186.

Relay 412 may be manually energized by push-button switch 476—H. When so energized it closes reverse switch 408 of high speed shaft motor 144, and opens interlock 412—1 preventing starting current through cross-slide relay 458 which controls clutch magnets 300, 301, 304 and 309.

Feed shaft control relay 470 may be manually energized by push-button switch 474—H or automatically by interlock 411—2. When so energized it closes holding circuit interlock 470—1; closes interlock 470—2 (in relay 411 circuit), so that the forward relay 411 of high speed feed shaft motor 144 may only remain energized when relay 470 is energized; closes interlock 470—3 which supplies DC current to the feed shaft clutch magnet 141.

The feed shaft differential control relay 471 may be energized by interlock 411—3 and, when so energized, closes holding circuit interlock 471—1 and opens interlock 471—2 in the direct current line of feed shaft clutch magnet 141.

The turret index automatic control relay 477 (which is employed for preliminary setting the index motor circuit) may be energized automatically by limit switch 271 operated by dog 272 on slide feed drum 213. When so energized, it closes holding circuit interlock 477—1 for relay 477; and closes interlock 477—2, which interlock energizes the turret index motor switch relay 406 as well as index brake operating solenoid 268 for releasing brake 266 when limit switch 478 is later closed by dog 272 on turret slide feed drum 213.

When indexing motor relay 406 is energized, it closes switch 403 causing indexing motor 264 to operate and, as pin 269 moves from the plunger carrying switches 270 and 270a, the spring of switch 270 first closes the latter, establishing a holding circuit for the indexing motor relay 406 and the solenoid 268, and then opens the holding circuit of relay 477, which becomes de-energized, opening its interlocks 477—1 and 477—2. With the energization of index motor relay 406, it opens its interlocks 406—2 and 406—3 in the circuit of the forward switch of feed shaft high speed motor 144 preventing further operating of the feed shaft 160 and the slide cam drum 213 during indexing of the turret.

After indexing of the turret, the pin 269a (or pin 269, as the case may be) will depress the plunger of switches 270 and 270a, opening switch 270, thus de-energizing indexing motor relay 406 and solenoid 268 stopping indexing motor 264 and allowing brake 266 to be applied to motor 264. The de-energization of indexing motor relay 406, however, closes its interlocks 406—2 and 406—3 in the forward running circuit of the high speed feed shaft motor 144 and, since its relay 411 has not been de-energized during turret indexing, but held energized by the closing of interlock 406—1, the feed shaft 160 and the slide cam drum 213 will then be actuated by motor 144 until the dog drum 169 causes the shaft 160 to be actuated from the spindle.

Relay 406 may be manually energized by push-button switch 479—H or automatically by interlock 477—2, as herein before stated; and, when so energized, it closes switch 403 of turret index motor 264; closes interlock 406—1 in the starting circuit of the feed shaft high speed motor relay 411; and opens interlocks 406—2 and 406—3 in the circuit of the forward switch 407 of feed shaft high speed motor 144.

Solenoid 268, which operates index brake 265 (see Figs. 25 and 26) is in parallel with relay 406 and, therefore, is similarly operated.

Relay 458 controlling the operation of the cross-slides (meaning any slide other than turret slide 226) may be manually energized by push-button switch 460—H or automatically energized by control drum switch 459—D. When so energized, relay 458 closes holding circuit interlock 458—1; closes interlock 458—2 thus energizing slide clutch magnet 300 and opens interlock 458—3, thus de-energizing slide brake magnet 301.

The guard controlling relay 413 may be manually energized by push-button switch 484—H or automatically by control drum operated switch 485—D, if switch 367 is in the position shown. When so energized, relay 413 closes holding circuit interlock 413—1 and closes forward switch 409 of the guard operating motor 366. The other guard controlling relay 414 may be energized manually by push-button switch 484—H, or automatically by control drum operated switch 485—D, when switch 367 is in the position opposite from that shown. When so energized, relay 414 closes holding circuit interlock 414—1 and closes reverse switch 410 of guard operating motor 366.

Figure 37 illustrates a control of the modified cross-slide actuating means shown in Fig. 32, and which may be substituted for magnets 300, 301, 304 and 309, their associated armatures 299 and 305, relay 458 and their associated switches and interlocks shown in Fig. 36. With particular reference to Figure 37, the relay 463 may be energized manually by the push-button 465—H or automatically by control drum operated switch 466—D and, when so energized, it closes holding circuit interlock 463—1, closes interlock 463—2 thus completing the circuit through forward clutch magnet 315, opens interlock 462—3 thus breaking the circuit through brake magnet 320; and opens interlock 463—4, preventing the simultaneous energization of relay 462.

Reverse relay 462 may be manually energized by push-button 467—H or automatically by control drum switch 468—D and, when so energized, it closes holding circuit interlock 462—1; closes interlock 462—2 thus completing a circuit through the reverse clutch magnet 314; opens interlock 463—3 thus breaking the circuit through the brake magnet 320; and opens interlock 462—4 preventing simultaneous energization of relay 463.

HAND AND AUTOMATIC OPERATION

*Hand transfer switch*

As hereinbefore stated, it is essential that the machine be controlled either automatically or by hand. Therefore, if hand operation of the machine is desired, hand transfer switch 425—H is placed in a position connecting the hand control line 426 with the main AC supply line 417, thus cutting off the current from the automatic AC control line 427. By energizing the line 426, the relay 428 is energized which opens the normally closed interlocks 428—1, 428—2 and 428—4 which disconnects the control of the high speed feed shaft motor 144 from the automatic control line 427 and prevents energization of this line by back circuits; and also closes the normally opened interlock 428—3 to provide a shunt across the dog control drum switch 429—D to render it inoperative. As the hand push-buttons 424—H, 433—H, 435—H, 481—H, 483—H, 488—H, 491—H, 495—H, 497—H, 444—H, 451—H, 456—H, 469—H, 474—H, 476—H, 479—H, 460—H, 484—H, 467—H, 465—H (Figs. 6, 36 and 37) are in the circuit of either the AC supply line 417, or the hand control line 426 which are now alive, and as the control drum operated switches 431—D, 480—D, 389—D, 492—D, 496—D, 443—D, 452—D, 457—D, 473—D, 472—D, 429—D, 485—D are in the circuit of the automatic control line 427 which is now dead, the control is by hand alone.

Should hand transfer switch 425—H be thrown into the automatic control, line 427 is electrically connected with and supplied from the AC supply line 417, thus becoming energized, and at the same time, hand control line 426 is disconnected from the AC supply line 417 and becomes dead. This deenergizes relay 428, closing interlocks 428—1, 428—2 and 428—4, and opening interlock 428—3. As the control drum operated switches above mentioned are all in circuit with the automatic control line 427, which is now alive, the control is through these switches, which are automatically operated by dogs on the control drum 169. As all the hand operated switches, with the exception of push-button 476—H which controls the reverse operation of the high speed feed shaft motor, which motor must not be operated in reverse when under automatic control, and push-button 479—H which starts the turret index and which index should not be started by hand when under automatic control, are in circuit with the AC supply line 417 which is alive, control is also by hand as well as automatic.

*Spindle motor control*

The spindle motor 112 (Figs. 6, 7, 10 and 36) is controlled by the relay 430 (shown in the "spindle" bracket Fig. 36) and relay 404 through the automatically operated normally open switch 431—D and the normally closed switch 432—D, the hand operated push buttons 433—H and 434—H, or the hand double contact push-button 435—H, and is directly connected to a variable speed transmission 113. This variable speed transmission (see Figs. 10 and 10a) may include a disk 700 keyed to the motor shaft 701 and a similar disk 702 keyed to the output shaft 114 of the transmission 113. These discs have arcuate paths 703 and 704 in their faces. A roller 705 is rotatably mounted on a stud 706, which stud is held in a rocker shaft 707. Said roller is held in friction contact with paths 703 and 704, and therefore transmits motion between discs 700 and 702, the ratio of speed between the two discs being dependent upon the position of the roller due to the rocking of shaft 707. To one end of shaft 707 is fastened an arm 708 to which is fastened a tension spring 709 which tends to hold arm 708, and hence roller 705, in the position where disc 702 is driven by disc 700 at its lowest speed. A pull solenoid 436 is also fastened to the end of arm 708 and when energized, it shifts arm 708 and hence roller 705 against the tension of spring 709 toward a position where disc 702 is driven by disc 700 at its highest speed. A finger 710 on the rocker shaft 707, by abutting against lug 711 on plate 712, limits the amount of movement which solenoid 436 can impart to rocker shaft 707, and plate 712 may be adjusted to any desired position by shaft 115 through worm 115—A and worm gear 713. Hence, it will be seen that when solenoid 436 is energized, roller 705 will be moved to a pre-selected position to give a pre-selected speed and when solenoid 436 is de-energized, roller 705 will be returned to a position corresponding to the lowest speed of shaft 114. A switch 437 is so located that when the transmission is at its lowest speed, it will be held open by arm 708, and when the transmission is in any but its lowest speed, switch 437 will be closed.

Depressing hand push button 433—H (or automatic switch 431—D) energizes relay 430, which closes the holding circuit interlock 430—1 and also closes interlock 430—2 which energizes relay 404, thus closing switch 401 starting the spindle motor 112. The relay 404 has a holding interlock 404—1 in series with the normally closed limit switch 437 in the variable speed transmission 113 forming a holding circuit, if switch 437 is closed.

When relay 404 is energized and the spindle motor is running, depressing hand push-button 434—H or the automatic switch 432—D, de-energizes relay 430 and solenoid 436. When de-energized relay 430 causes the holding interlocks 430—1 and 430—2 to open and, if the variable speed transmission 113 is in its lowest speed, there is no holding circuit through relay 404 because transmission switch 437 is open, thus relay 404 opens switch 401 stopping the spindle motor 112. If the variable speed transmission 113 is running at any speed higher than its lowest speed, transmission switch 437 is closed and there is a holding circuit for relay 404 through closed interlock 404—1 and switch 437, whereby the motor 112 does not stop until the device returns to low speed. As solenoid 436 is de-energized, spring 709 acting on arm 708, moves roller 705 to the lowest speed position. When lowest speed is reached, switch 437 opens, breaking the circuit through relay 404, thus stopping the spindle motor 112.

When the jog-push-button 435—H is depressed, relay 404 is energized and the spindle motor 112 rotates as long as button 435—H is depressed. However, there is now no circuit through solenoid 436 and, therefore, no holding circuit can be made through switch 437, as it is open; and as relay 430 is not energized, interlock 430—2 remains open, so that when jog-push-button 435—H is released, relay 404 is immediately de-energized stopping the motor 112. The motor can therefore be jogged only at the lowest speed of the speed change device. A standard overload release 438 is placed in the circuit of the relay 430.

A limit switch 183, which is normally biased to open, is placed in the circuits of relays 430 and 404 controlling the spindle motor 112. This switch 183 is mounted on the machine so that it is closed only when the change gear cover 182

(Figs. 6 and 7) is in place, thus making it impossible to operate the spindle motor 112 at any other time, as hereinbefore described. It should be noted that the motor 112 can be started by hand or jogged, when transfer switch 425—H is in either hand or automatic position, but that it cannot be started automatically, when switch 425—H is in the hand position.

Speed transmission control

As hereinbefore described, the spindle variable speed change transmission 113 and the feed shaft variable speed change transmission 126 are controlled by pre-selector 118 (Figs. 6, 10, 15, 16 and 17), and as many speeds as desired may be pre-selected. For example, three speeds have been chosen as shown particularly in Figure 15 for each transmission—i. e. 113 and 126—but since the pre-selection and selection of any one speed is the same as any other, only the selection of No. 1 speed for the spindle transmission device 113 now will be described.

The pre-selector motors 192 and 192a, which actuate the shafts 115 and 135 to effect speed change of spindle variable transmission 113 and of the feed shaft variable transmission 126, respectively, are normally inoperative and are only caused to operate by operation of the push-buttons 444—H, 451—H, 456—H or by actuation of control drum switches 443—D, 452—D, 457—D.

Each station of transmission change speed (No. 1, No. 2 and No. 3—Figs. 6 and 15) for the spindle transmission device 113 comprises a switch carrier 199 loose on the shaft 196 (Figs. 15, 16 and 17) and rotated to the desired position by worm 203 by a tool or crank inserted in the proper tool socket 204 (Figs. 6, 15 and 17), whereby the corresponding dial 439 shows its adjusted position through slot 440. With specific reference to No. 1 speed of spindle transmission 113, if a pre-selected speed is less than that at which the variable speed transmission 113 is running, cam 197 will allow switch 201 to remain in the position shown on the diagram (Fig. 36), namely with circuit to forward relay 441 open and the circuit to reverse relay 442 closed. Conversely, if the variable speed transmission 113 is running at a speed less than that indicated on the dial 439 of this pre-selection, the cam 197 will operate switch 201 closing the circuit to relay 441 and opening the circuit to relay 442 and as the variable speed transmission 113 is at a speed different than that preselected, limit switch 200 will be closed. Automatic operation of switch 443—D or hand operation of push-button 444—H energizes relay 445, thus completing a holding circuit through interlock 445—1 by closing the latter and, also, closing interlock 445—2, thus energizing either relay 441 or relay 442 depending on the position of switch 201. If relay 441 is energized, the double throw interlocks 441—1 and 441—2 are actuated removing the DC current from the forward actuating coil 446 of the spindle speed pre-selecting motor 192 and replacing it with the AC current from line 417—418, which causes the motor 192 to rotate in the forward direction. The spindle speed pre-selecting motor 192 will now continue to rotate in the forward direction until the desired speed is reached, when cam 198 (Figs. 15, 17, 19 and 20) will open switch 200 breaking the holding circuit through interlock 445—1, opening interlock 445—2 which de-energizes relay 441, which latter in turn, by means of double throw interlocks 441—1 and 441—2, replaces the AC current from line 417—418 with DC current from lines 420—421, thus braking the motor.

If switch 201 is in a position such that relay 442 is energized when interlock 445—2 is closed, interlock 442—1 is closed placing AC current from lines 417—418 across the reverse rotation coil 447 of spindle speed pre-selecting motor 192 and interlock 442—2 is opened taking the DC current from line 420—421 from the motor which now will rotate in the reverse direction. The spindle speed pre-selector motor 192 will rotate until the desired speed is reached, when switch 200 will open de-energizing relay 445, thus opening holding interlock 445—1 and interlock 445—2 which latter de-energizes relay 442. De-energizing relay 442 opens interlock 442—1 taking the AC current from the reverse rotation coil 447 and closes interlock 442—2 which places DC current across the forward actuating coil 446 of said motor, thus braking the motor.

A safety normally open interlock 430—3, placed in the line 417 (see—pre-selector bracket—Fig. 36) supplying current to the spindle speed pre-selector motor 192 (of the shaded pole type) prevents this motor from being energized at any time other than when the spindle motor 112 is running. Energizing relay 430 (see—spindle bracket—Fig. 36) starts the spindle motor 112 and closes interlock 430—3 which energizes that portion of line 417 in which the motor 192 and the pre-selector interlocks, relays and switches are disposed, thus making it possible to energize the motor 192 only when the spindle 112 is operating and which is also true with respect to the feed shaft speed pre-selecting motor 192a.

In a like manner, No. 2 speed of the spindle variable speed device transmission is pre-selected by relay 448, interlocks 448—1 and 448—2, stop switch 449 and direction switch 450 (corresponding to switches 200 and 201, respectively, of No. 1 speed), hand push-button 451—H and automatic switch 452—D; and No. 3, speed is pre-selected by relay 453, interlocks 453—1 and 453—2, stop switch 454 and direction switch 455 (also corresponding to switches 200 and 201, respectively, of No. 1 speed), hand push-button 456—H and automatic switch 457—D.

The feed-shaft variable speed device 126 (Fig. 10) is controlled by pre-selector 118 (Figs. 6, 15, 16 and 17) in the same way as the speed change device just described above; therefore, further description is not necessary, except to say that the switch carriers 199a, are loosely mounted on shaft 196—A; and cam carriers 600a mounted on shaft 196a and the shaft 135 are actuated by motor 192a.

Feed shaft operation control

As before stated, the feed shaft, which comprises the power unit shaft 140 and secondary unit shaft 160, (Figs. 6, 10 and 13) is driven by the spindle 101 for cutting operations of the machine, and by motor 144 for the high speed idle movements. This drive is controlled as follows:

Assume the transfer switch 425—H to be in the automatic position, as shown in Fig. 36, with the feed shaft stopped but with the spindle 101 being rotated by motor 112, and it is desired to start the feed shaft (for convenience referred to as shaft 160) on the fast motion driven by motor 144. By depressing push-button 469—H relay 411 is energized closing switch 407 and starting motor 144 forward; but relay 411 also will open interlock 411—5 which breaks the circuit to feed shaft magnet 141 preventing connection of the feed shaft and the spindle, and will close interlock 411—1 of a holding circuit for relay 411, because interlock 411—2 has been also closed completing an energizing circuit through relay 470, hence closing interlock 470—2 and also interlock 470—1, which latter establishes a holding circuit to retain relay 470 energized. At the same time relay 411 opens interlock 411—4 preventing any circuit through relay 412 (the reversing relay of feed shaft high speed motor 144) and closes interlock 411—3 thus energizing relay 471, which holds itself energized by closing interlock 471—1 through differential switch 156, which is held closed by the hereinbefore described differential action when the feed shaft 160 is driven by motor 144 (Figs. 13 and 14). The energization of relay 471 also opens interlock 471—2 (see "Magnet clutch" bracket—Fig. 36), but since interlock 411—5 has been opened upon energization of relay 411, no change takes place in this circuit; and also when relay 470 was energized, as above stated, it closed interlock 470—3, but likewise, since interlock 411—5 is open, no change takes place in the circuit of the magnetic clutch 141. The feed shaft is now driven forward at its high speed by motor 144.

To change from this high idling speed to the low cutting speed driven by the spindle 101, as shown in Fig. 10, a dog on control drum 169 (Figs. 12 and 36) opens the switch 472—D, which breaks the holding circuit through relay 411, thus opening holding interlock 411—1—opens interlock 411—2 in the circuit of relay 470 (but since relay 470 is held energized by a holding circuit through interlock 470—1 no change takes place),—closes interlock 411—5 in the circuit of the magnetic clutch 141 (but causes no change since interlock 471—2 is open), opens interlock 411—3 (but causes no change since relay 471 is held energized through closed interlock 471—1), and closes interlock 411—4 which energizes the reverse relay 412 reversing the current to motor 144, thus braking its speed. When motor 144 has slowed down to a speed so that clutch armature 142 and clutch magnet 141 (Fig. 13) are running at approximately the same speed, differential switch 156 opens and breaks the circuit through relay 412 and relay 471, the latter relay thus closing interlock 471—2 causing clutch magnet 141 to be energized which then connects the feed shaft 160 to the spindle 101. The feed shaft 160 continues to be driven by the spindle until the control drum switch 473—D is closed by a dog, which starts motor 144 forward, breaks the circuit through magnet 141 by opening interlock 411—5 and the above procedure is repeated.

When the machine has finished its cycle, a dog on the drum 169 operates switch 429—D, which breaks the holding circuit through relay 470, thus opening interlock 470—3 breaking the circuit through magnet 141 disconnecting the feed shaft from the spindle, and opening interlock 470—2 which breaks the holding circuit through relay 411 and stops motor 144, by the hereinbefore described plugging circuit, if it should be running. The feed shaft is now stopped.

Instead of starting by means of the high speed motor 144, as hereinbefore described, the spindle drive to the shaft 140 may be started by depressing hand push-button 474—H. This energizes relay 470 which closes holding interlock 470—1, closes interlock 470—2 (which causes no change), and closes interlock 470—3 thus energizing magnet 141 and connecting the feed shaft 160 to the spindle 101. This low cutting speed can now be changed to the high idling speed as before described.

The feed shaft 160 can be stopped manually by opening switch 475—H which has the same effect as operating switch 429—D.

In "placing" or "setting up" the work in the machine, it is necessary to manually control the operation of the feed shaft 160, in its fast forward and reverse rotation, from motor 144 as well as in its slow feed rotation from the spindle. This is accomplished by the hand switches 469—H, 476—H, 474—H (arranged adjacent each other on the panel, Fig. 6) and the hand transfer switch 425—H, first, by closing the hand control circuit 426 by switch 425—H thus breaking the automatic circuit 427; then by closing switch 469—H energizing relay 411, the motor 144 may be actuated forwardly or intermittently jogged together with the control drum 169, the slide 226 or other instrumentalities operated by the feed shaft 160 to the desired position, the motor 144 stopping whenever switch 469—H is opened because the holding circuit is connected with the automatic line 427 which was previously broken. The closing of switch 476—H energizes the reverse relay 412 actuating motor 144 in the reverse direction in the same manner.

With the transfer switch 425—H connected to hand control line 426, relay 428 is energized which closes interlock 428—3. Now the slow cutting motion of the feed shaft 160 may be started manually by closing switch 474—H, energizing relay 470 which closes interlock 470—1 establishing holding circuit therethrough, as well as closing interlock 428—3. At the same time, relay 470 closes interlock 470—3 establishing a circuit in the magnetic clutch 141, which thus connects shaft 160 to spindle drive and which continues until the normally closed switch 475—H is manually opened, thus breaking the circuit through relay 470 which opens holding circuit interlock 470—1 which also opens interlock 470—3 in the circuit of the magnetic clutch 141 resulting in the spindle being disconnected from the feed shaft 160. As dog operated switch 429—D has been shunted by interlock 428—3, opening this switch automatically will not stop the feed, as the holding circuit of relay 470 is maintained through interlock 428—3.

*Turret indexing control*

The turret 238 is rotated or "indexed" by motor 264 through a Geneva movement mechanism 255. This indexing must take place, when the turret slide 226 and hence the turret slide drum 213 are at certain positions in its stroke, and, while the indexing is taking place, the drum 213 must be stopped.

A dog 272 on the turret slide cam drum 213, at sometime before the turret slide reaches the desired position, closes switch 271 (Figs. 22 and 36) which is normally urged to open position (as is the switch 478). This energizes relay 477, from the AC automatic control line 427, thus closing the holding circuit interlock 477—1 and closing interlock 477—2 but does not energize relay 406, which actuates index motor switch 403, because the other switch 478, also controlled by slide cam drum 213, is in its normal open position. Now, when the turret slide reaches the desired position for indexing, dog 272 closes switch 478 energizing relay 406 thus starting the index motor 264. The Geneva mechanism 255 starts to revolve and dog 269 thereon, first moves to allow switch 270 (normally biased to close)

to close completing a holding circuit for relay 406 thus maintaining operation of index motor 264, and at the same time allows switch 270a (normally biased to open) to open thus de-energizing relay 477 and opening the starting interlock 477—2. When Geneva mechanism 255 has made ½ revolution, thus indexing the turret 238 one station, dog 269a thereon is brought in position first to close switch 270a and then to open switch 270, and as interlock 477—1 is open (by reason of de-energizing relay 477) no circuit is established, but the holding circuit through relay 406 is broken by the opening of switch 270 thus motor 264 stops.

As hereinbefore mentioned, turret slide cam drum 213, and hence feed shaft 160, must be stopped while indexing of the turret is taking place, and feed shaft 160 and the slide 226 must start on the fast idle motion after the indexing to bring the tools to work-performing or cutting position. For this purpose relay 406 is provided with interlocks 406—1, 406—2 and 406—3 controlled thereby. When relay 406 is energized, thus starting the index motor 264, interlocks 406—2 and 406—3, which are in service lines 399 and 400, respectively, supplying current to motor 144, are opened and interlock 406—1 is closed. When interlock 406—1 is closed relay 411 is energized and closes switch 407, but this cannot start feed shaft high speed motor 144 because interlocks 406—2 and 406—3 are opened. Also relay 411 being energized, interlock 411—5 is opened, thus breaking the circuit to shaft clutch magnet 141 and disconnecting the feed shaft 160 from the spindle drive, hence the feed shaft 160 stops. After indexing has been completed and relay 406 is de-energized by switch 270 being opened by one of the turret dogs 269 or 269a, interlocks 406—2 and 406—3 are closed which starts high speed feed shaft motor 144, also interlock 406—1 opens, but the circuit is held through the relay 411 by interlocks 411—1 and 470—2 which have been closed, it being understood that interlock 470—2 was closed by relay 470, which latter was energized by the closing of interlock 411—2 when relay 411 was energized.

As the indexing starting circuit (through switches 271 and 478) and the starting circuit of motor 144 (through interlocks 406—1) are from the automatic control lines 427, no indexing will take place when motor 144 is reversed, because the reversal is from hand control line 426 through the relay 412.

For manual indexing, when hand transfer switch 425—H is in the position connecting line 426 for manual control, there is provided a pushbutton 479—H which, when closed, completes a starting circuit from manual control line 426 through relay 406, and as holding circuit for relay 406 is through switch 270 (which closes when turret dogs 269 or 269a are out of contact therewith), indexing takes place.

For braking the indexing motor 264, there is provided a disc 265 keyed to shaft 262 with which a brake shoe 266 normally co-acts under the tension of spring 267 (Figs. 25 and 26). A solenoid 268 is in parallel with starter relay 406 (Fig. 36) and releases brake 266 when energized. Therefore brake 266 is operative when relay 406 is inoperative, and vice versa.

*Cross slide control*

The magnetic clutches 300 and 304 and the magnetic brakes 301 and 309 (Fig. 30) operating the rear and front cross slide drums 286 and 286a and the magnetic clutch 342 and its magnetic brake 344 (Fig. 35) operating the backfacer drum 335, are identically controlled so I will describe the control of the rear cross-slide drum 286 with reference to the "Cross-slide" and "Magnetic clutch" bracketed portions of the circuits in Fig. 36.

The slide magnets 300 and 301 are controlled by relay 458. This relay may be excited automatically by switch 459—D or by hand pushbutton 460—H and, when excited, it energizes slide "go" magnet 300 and de-energizes the slide "brake" magnet 301 by means of interlocks 458—2 and 458—3, and closes interlock 458—1 in a holding circuit which is completed after drum 286 has travelled far enough that dog 302 allows switch 303 to close. The relay 458 is de-energized by the switch 303 when the drum 286 next brings dog 302 thereon in contact with switch 303 breaking the holding circuit, at which time magnet 300 will be de-energized and brake magnet 301 energized by the opening of interlock 458—2 and closing of interlock 458—3 respectively. A normally closed interlock 412—1, operated by the feed shaft high speed motor reverse relay 412 and placed in circuit with the cross-slide starting switches 459—D and 460—H, prevents starting the slides when the feed shaft high speed motor 144 is reversed.

As hereinbefore stated, it may be desired to use a reversing drum 286b for the cross slide operation, as illustrated in Figure 32, in which event the control for this reversing drum 286b is illustrated in Figure 37. As shown the drum 286b has just finished its reverse rotation and dog 302b has opened limit switch 461, thus cutting current from reverse relay 462. As shown, forward relay 463 is de-energized and interlocks 462—2 and 463—2 are open which de-energizes reverse magnet 314 and forward magnet 315, respectively, but as interlocks 462—3 and 463—3 are closed, brake magnet 320 is energized and the drum 286b is held stationary. Also since switch 461 is open, relay 462 cannot be energized and the drum cannot be started in reverse, but, since limit switch 464 is closed, relay 463 can be energized by closing hand push-button 465—H or automatic switch 466—D and thus the drum may be started in its forward rotation. With relay 463 thus energized, holding interlock 463—1 is closed,—interlock 463—3 is opened which de-energizes the brake magnet 320,—interlock 463—2 is closed which energizes forward magnet 315, and interlock 463—4 is opened thus preventing energizing of reverse relay 462 when switch 461 has closed due to rotation of drum 286b moving dog 302b out of engagement therewith.

The drum 286b now rotates forward until dog 302b on drum 286b opens switch 464, which de-energizes relay 463, which in turn opens holding interlock 463—1, opens interlock 463—2 thus de-energizing forward magnet 315, closes interlock 463—3 thus energizing the brake magnet 320, and closes interlock 463—4 making it possible to energize the reverse relay 462.

By closing hand push-button 467—H or automatic switch 468—D, reverse relay 462 is energized closing holding interlock 462—1, opening brake magnet interlock 462—3, closing reverse magnet interlock 462—2 and opening safety interlock 462—4. The drum 286b now runs in reverse until its dog 302b again opens switch 461, which de-energizes relay 462 resulting in opening of holding interlock 462—1, opening of reverse magnet interlock 462—2, closing of brake magnet interlock 462—3 and closing of safety interlock 462—4.

The normally closed interlock 412—1 (corresponding to that shown in Fig. 36) operated by the feed shaft high speed motor reverse relay 412 and placed in circuit with the starting switches 467—H, 468—D, 465—H and 466—D, prevents the starting of the slides either forward or reverse when the feed shaft motor 144 is reversed.

Chip guard control

The guard 355 is slidably actuated toward the spindle 101 by the forward rotation of motor 366 and away from the spindle by reverse rotation of motor 366. Assume the guard is in the position illustrated in Fig. 6, namely away from the spindle and that dog 368 on the guard has operated snap switch 367 to a position so that a circuit can be made through relay 413 (Fig. 36), which operates the forward starting switch 409 of motor 366, then closing push-button 484—H manually or switch 485—D automatically completes a circuit through relay 413, starting motor 366 forwardly. This energization of relay 413 closes holding circuit interlock 413—1. The guard 355 now moves toward the chuck 376 until the other dog 369 on the guard operates snap switch 367, first breaking the circuit through relay 413, which opens the holding interlock 413—1 and stops motor 366. Snap switch 367 is now so positioned (that is—in a position opposite to that shown in Figs. 6 and 36) that the next time switches 484—H or 485—D are operated a circuit will be formed through relay 414, which operates the reverse switch 410 of motor 366 causing the motor to operate in reverse direction and move guard 355 away from the chuck 376 to the full line position shown in Fig. 6, thereupon the cycle of operation just described may be repeated.

Lubricating control

A single phase motor 186 (Figs. 7, 8 and 36) is actuated when either of the normally open interlocks 411—6 or 404—2 of relays 411 and 404, respectively, are closed by the energization of said relays. Therefore, when ever feed shaft high speed motor 144 or spindle motor 112 is operating, the lubricating motor 186 is also operating and stops only when both motors 144 and 112 are inoperative.

Coolant control

A coolant motor 372, which may be a three phase motor, is started by closing switch 402 operated by relay 405. This motor can be started automatically by control dog drum switch 480—D or manually by push-button 481—H. When the motor 372 is started either manually or automatically, a holding circuit is established through relay 405 by the latter closing interlock 405—1. The motor can be stopped automatically by switch 482—D or manually by push-button 483—H, either of which opens said holding circuit.

Chuck control

The chuck 376 has its jaws 377a opened and closed by the mechanisms shown in Figs. 10, 34 and 38. To operate valve piston 388 in opposite directions which controls the direction of movement of the chuck jaws 377a, there are provided solenoids 389 and 390 whose energization is controlled by relays 486 and 487, respectively, through interlocks 486—2 and 487—2 in the circuits of the solenoids. Relay 486 may be energized manually by closing push-button 488—H or automatically by switch 489—D. Energizing relay 486 closes interlock 486—2 thus energizing solenoid 389 to move piston 388 into the position shown in Fig. 38, closes interlock 486—1 forming a holding circuit, if switch 490 is closed (as shown in Fig. 36) and opens safety interlock 486—3 in the circuit of relay 487. Solenoid 389 now moves valve piston 388 to the end of its stroke in one direction (as shown in Fig. 38) where the end of the piston opens switch 490, breaking the holding circuit through relay 486 which closes safety interlock 486—3. When relay 487 is energized manually by push-button 491—H or automatically by switch 492—D, it closes the holding circuit through interlock 487—1, energizing solenoid 390 by closing interlock 487—2, and at the same time opens the safety interlock 487—3 in the circuit of relay 486. Solenoid 390 now moves piston 388 to the end of its stroke in its other direction, where the end of the piston opens switch 493, breaking the holding circuit through relay 487 which closes safety interlock 487—3 in circuit with relay 486.

The relief piston valve 395 is moved in a direction and normally held by spring 396 in the position shown in Fig. 38 and is moved in its other direction by solenoid 397, energization of which is controlled by relay 494, which operates interlock 494—2 in the circuit of said solenoid. Relay 494 may be energized manually by push-button 495—H or automatically by switch 496—D (Fig. 36), resulting in closing holding circuit interlock 494—1 and closing interlock 494—2, thus energizing solenoid 397. This pulls valve piston 395 to the end of its stroke against the pressure of spring 396, and holds it there until the holding circuit is broken either manually by opening push-button switch 497—H or automatically by opening switch 498—D.

Hand cranking control

When the machine is cranked by hand all power drive to the feed shaft must be cut out. By shifting hand cranking shaft 177a inwardly to a position so that pinion 177 (Figs. 7, 14 and 18) will mesh with gear 176, switch 181 is first opened breaking line 417 and cutting out all drive to the feed shaft 160 (whether manually or automatically controlled), switch 181 being disposed in the AC supply line 417 ahead of the manual transfer switch 425—H (Fig. 36); and upon inwardly movement, the pinion 177 engages gear 176 allowing manual rotatability of control drum 169, the feed shaft 160 and all instrumentalities actuated thereby.

It is to be understood that wherever in the specification and claims the term "slide," "slides," "tool slide or slides," "slide member or members," "sliding member or members," "slidable work performing members," are employed they mean any element or elements movable to and from a spindle, or an equivalent element or parts, for the purpose of bringing tool and work into and from working relation with respect to each other, whether said movement is or is not rectilinear and whether the tools are carried by the "slide" and the work by the spindle, or vice versa.

Having thus described the invention and the manner in which the same is performed, in accordance with the preferred embodiments of the invention as at present devised, it is to be understood that the exact construction, combination and arrangement of parts may be modified and varied within the scope of the appended claims, as the invention is susceptible of various modifications, changes, and variations without departing from the scope thereof and the improvement and advancement in the art afforded thereby.

That which is claimed is:

1. A machine tool comprising two detachable units forming an integral machine when attached together, one of said units including a supporting frame, a rotatable spindle mounted in said frame, a feed shaft mounted in the frame for actuating operable slides, means in the frame for actuating said spindle and feed shaft; the other of said units comprising a frame having sliding members thereon for cooperative operation with said spindle and operable from said feed shaft; and detachable connecting means between the frames of the units and between said feed shaft and said sliding members, whereby any one of a plurality of second units may be attached to the first unit to form integral machines of different types.

2. In a machine tool, comprising a frame, one portion of the frame having mounted therein a rotatable spindle, a feed shaft and means for actuating said spindle and feed shaft, the other portion of the frame having a slidable work performing member mounted thereon for cooperation with the spindle and actuated from said feed shaft, the said two portions of said frame being detachable from and attachable to each other, and said feed shaft having a detachable coupling therein, whereby one of said portions of said machine may have another portion, having similar and cooperating attaching means, substituted therefor to form an integral machine with the same or different characteristics.

3. In a metal cutting machine, a combination of a work holding means and tool holding means which have interrelated functions, electrical means for controlling and correlating these functions, both automatically and manually, and means for shifting the control from automatic to manual, or vice versa, said electrical means including means for preventing operation of the automatic control when the manual control is effective.

4. In a machine tool, the combination of a rotatable spindle, a slide feed shaft, a reversible constant speed driving motor for said shaft, operable means for connecting said spindle and said shaft whereby the latter may be driven from the former, electrical control means for rendering the drive of said shaft from said constant speed motor effective and ineffective, electrical control means for preventing operating of said means for connecting said shaft and spindle while said shaft is being actuated by said constant speed motor, and conversely.

5. In a machine tool as set forth in claim 4 further comprising a control member actuated synchronously with said shaft for regulating the operation of both of said electrical control means.

6. In a machine tool, a spindle, means for driving the spindle, a feed shaft, a disconnectable driving connection between the spindle and the feed shaft, a constant speed motor connection with the feed shaft, controlled means for starting said motor and disconnecting said driving connection between the spindle and the feed shaft, and conversely, and means responsive to the relative speeds of said feed shaft and said disconnectable driving connection for timing the operation of said last mentioned means for connecting said disconnected driving connection.

7. In a machine tool, a spindle, a feed shaft, a driving connection between the spindle and the feed shaft, a member loosely rotatable on the feed shaft and rotatable from the spindle, a constant speed electric motor connected to the feed shaft, a clutch for connecting the feed shaft with the loosely rotatable member, means for operating said clutch to connect the feed shaft with the spindle and for de-energizing said constant speed motor, and means for rendering said clutch operating means inoperative to connect the clutch and rotatable member except when the feed shaft and the loosely rotatable member are revolving at approximately the same speeds.

8. In a machine tool, the combination of a spindle and means for rotating the same, a feed shaft for a working element, operable means for connecting the spindle and said shaft, means for operating said connecting means, a constant speed driving member having an operable connection with said shaft, and means for rendering inoperative said means for operating the connecting means except when said means for connecting the spindle and the shaft is rotating at approximately the same speed as said feed shaft.

9. In a machine tool, the combination of a rotatable spindle, a slide feed shaft, operable means for connecting the spindle and said shaft, a constant speed driving member having an operable connection with said shaft, a control member actuated synchronously with said shaft, means for operating said connecting means from said control member, and means for rendering inoperative said means for operating the connecting means except when said means for connecting the spindle and the shaft is rotating at approximately the same speed as said feed shaft.

10. In a machine tool, the combination of a rotatable spindle, a slide feed shaft, operable means for connecting the spindle and said shaft, means for operating said connecting means, a constant speed driving member having operable connection with said shaft, means preventing the connecting of said shaft with the spindle while said shaft is being operated by constant speed member or conversely, and means for rendering inoperative said means for operating the connecting means except when said means for connecting the spindle and the shaft is rotating at approximately the same speed as said feed shaft.

11. In a machine tool, a spindle and a feed shaft, a driving connection between said spindle and said feed shaft for driving said feed shaft in one direction only for the purpose of performing work, a reversible driving member connected with the feed shaft, means for rendering effective and ineffective the reversible driving member for driving said feed shaft, automatic and manual means for controlling said driving connection and the operation of said reversible driving member, and means permitting the reversible driving member to drive the feed shaft only in the same direction as driven by the spindle when said parts of the machine are under automatic control but, when under manual control, permitting said feed shaft to be driven by said reversible driving member in either direction.

12. In a machine tool, the combination of a spindle, a feed shaft, an operable connection between the shaft and said spindle for rotation by the spindle in one direction, electrically operated means for making and breaking said connection between said spindle and said shaft, a control member synchronously actuated with said shaft and by which said electrically operated means may be controlled, and electrical means for reversing the rotation of said shaft including electric switch means for rendering ineffective the operation of said electrically operated means to make the connection between said shaft and said spindle when said shaft is reversed.

13. In a machine tool, the combination of a spindle, a shaft connectable to said spindle for rotation by the spindle in one direction, electrically operated means for making and breaking said connection, means for reversing the rotation of said shaft, a control member synchronously actuated with said shaft and by which said electrically operated means may be controlled, said electrically operated means including means permitting said shaft to rotate only in said first direction when under control of said control member, manual means for controlling said electrically operated means and including means for shifting the control of the electrically operated means from said control member to the manual control means, and conversely, said manual control means also including means for causing said shaft to rotate in either direction.

14. In a machine tool, the combination of a rotatable spindle and means for rotating the same, a slide feed shaft, a reversible constant speed driving member for said shaft, an automatic control member actuated synchronously with said shaft, means controlled by said control member for connecting and disconnecting said shaft to and from said spindle and for controlling the operation of the constant speed driving member in one direction, manual means for reversing the reversible constant speed driving member, means for rendering inoperative the operation of said first mentioned means from said control member, when the constant speed driving member is reversed.

15. In a machine tool, the combination of a driving means, a spindle driven from said driving means, a speed changing device between said driving means and the spindle, a slide feed shaft, a second change speed device driven by the spindle, a reversible constant speed driving means for driving said shaft, means for connecting said second change speed device driven by the spindle to the shaft whereby the latter may be driven from the spindle, means for rendering said constant speed member effective and ineffective for driving said shaft, a control member actuated synchronously with said shaft; means controlled by said control member for actuating said first and second change speed devices, said means for connecting said second change speed device to said shaft and for controlling the drive between the constant speed member and the shaft; and manual means for actuating said first and second change speed devices, the connection between said second change speed devices and said shaft, and for controlling the drive of the constant speed member to said shaft.

16. In a machine tool as set forth in claim 15 further characterized by means for rendering inoperative any of said means for actuating said first and second change speed devices, and the means for connecting said second speed change device to said shaft and for controlling the drive between the constant speed drive member and the shaft, when the constant speed member is reversed.

17. In a machine tool, the combination of a rotatable spindle and means for rotating the same, a slide feed shaft, means for connecting the spindle with the shaft including an electrically operated clutch and means for operating the same, a reversible electric motor, a positive connection between the rotor of said motor and the shaft, means for energizing said motor to run in either the forward or reverse direction, electrical interlocks controlled by the clutch operating means and by the motor energizing means for preventing the energization of said motor while the electrically operated clutch is in clutching position and vice versa, an operable control member actuated synchronously with said shaft, electrical means including switches automatically controlled from the control member for controlling the operation of the clutch operating means and the motor energizing means in a forward direction, manual means including electrical switches for controlling the clutch operating means and for controlling the motor energizing means whereby said motor may be actuated in either direction, and electric means whereby the control member is rendered ineffective when the said motor is reversed.

18. In a machine tool as set forth in claim 17 further characterized by manual means for rotating said shaft, and a switch actuated by said manual rotating means for said shaft to render ineffective both said automatic and manual control means for the clutch operating means and the motor energizing means when said manual means for rotating the shaft by hand is operated to manually rotate said shaft.

19. In a machine tool, the combination of a spindle and means for rotating the same, a slide feed shaft, operable connectable and disconnectable means for driving said shaft from the spindle, a reversible constant speed driving member for driving said shaft in either direction independently of the spindle, an automatic control member actuated synchronously with said shaft, means controlled by said control member for operating said connectable and disconnectable means and the operation of said constant speed driving member in one direction, and manual means for actuating said means which operates said connectable and disconnectable means and for controlling the operation of said constant speed driving member in either direction of its movement.

20. In a machine tool as set forth in claim 19 further characterized by means for changing from manual to automatic control and which renders said automatic control inoperative when the machine is under manual control, and vice versa.

21. In a machine tool as set forth in claim 19 further characterized by means for timing the effective operation of said means for operating the connectable and disconnectable means until said shaft is rotating at approximately the same speed as said drive from spindle.

22. In a machine tool as set forth in claim 19 further characterized by means for manually rotating said shaft, and means for rendering inoperative said connectable and disconnectable means and said reversible constant speed drive member, when said shaft is rotated by hand.

23. In a machine tool as set forth in claim 19 further characterized by said connectable and disconnectable means including a change speed device, and means for operating the change speed device from said control member.

24. In a machine tool as set forth in claim 19 further characterized by a change speed device, in the driving connection between said shaft and said spindle, means for operating the change speed device from said control member, and manual means for operating the speed change device.

25. In a machine tool, a spindle, means for driving the spindle, a feed shaft, a disconnectable driving connection between the spindle and the feed shaft, an electric motor, a driving connection between the motor and the feed shaft, manually operable means for rotating the feed shaft, and means actuated by the manually operable means for disconnecting the driving connection between the feed shaft and the spindle and for de-energizing said motor, when said feed shaft is operated by said manually operable means.

26. In a machine tool, the combination of a spindle, a constant speed electric motor, a driving connection between said motor and said spindle, including a speed changing device; a feed shaft, a driving connection between the spindle and the feed shaft including a speed changing device; a preselecter including adjustable preselecting elements, connected with both said speed change devices for effecting various changes of speed between the motor and the spindle and between the spindle and feed shaft; and means actuated from the operation of said machine for selecting any of these preselected speeds automatically at predetermined times, and manual means for selecting any predetermined speed at will of the attendant.

27. In a machine tool, a rotatable spindle and a feed shaft for operating slides, means for actuating said spindle and feed shaft, means for controlling the operation of said spindle and said feed shaft including a hollow control drum actuated synchronously with the feed shaft, dogs carried on and adjustable from the exterior of and protruding inside of said control drum, relatively stationary control elements operated on by the dogs located inside the control drums and means mounting the drum for axial rotation and permitting axial removal of the drum from operative position without disturbing said dogs and said elements inside the drum.

28. In a machine tool, a constant speed driving member, a spindle, a variable speed connection between said driving member and said spindle, a feed shaft, a variable speed connection between said spindle and said feed shaft, a second constant speed driving member for driving said feed shaft, a slide mounted in cooperative relation with the spindle, means for connecting and disconnecting the feed shaft from said slide, an operative control member actuated synchronously with said shaft means controlled by said control member for rendering effective and ineffective said connecting and disconnecting means between the slide and the feed shaft.

29. In a machine tool, as set forth in claim 28 further having manual control means for actuating the connection between the tool slides and the feed shaft.

30. In an automatic lathe, the combination of a spindle and a slide, a feed shaft for actuating the slide, control mechanism actuated synchronously with the feed shaft, means for operatively connecting and disconnecting said slide with the feed shaft, and means actuated by the control mechanism for causing said connecting means to connect the slide with the feed shaft, and means actuated by the slide itself when in a predetermined position for causing the disconnection of the slide from the feed shaft.

31. In an automatic lathe, the combination of a spindle and a slide, a feed shaft for actuating the slide, a control mechanism actuated synchronously with the feed shaft, electro-magnetic clutches for operatively connecting and disconnecting said slide with the feed shaft and means including electrical switches actuated by said control means for actuating said magnetic clutches to connect the slide with the feed shaft and further including other electrical switches actuated by the slide itself when in a predetermined position or positions for disconnecting the slide from the said shaft.

32. In an automatic machine tool, the combination of a rotatable spindle and a plurality of slides mounted in cooperative relation with the spindle, a feed shaft for actuating the slides, means for actuating the feed shaft, a control element operated synchronously with the feed shaft, separate means for each slide for actuating each slide independently, an operative connection between said separate slide actuating means and the feed shaft and each including a magnetic clutch, and means actuated by said control element for causing said magnetic clutches to connect said slide actuating means with said feed shaft and operated by the slide actuating means itself when in a predetermined position for disconnecting the slide actuating means from the feed shaft.

33. In a machine tool, the combination of an operable tool carrying member, means for operating the tool carrying member including a rotatable element, a rotatable shaft, means for connecting and disconnecting the shaft to the rotatable element, means for braking the rotatable element when not connected to the shaft.

34. In a machine tool, the combination of an operable tool carrying member, means for operating the tool carrying member including a rotatable element, a rotatable shaft, means for connecting and disconnecting the shaft to and from the rotatable element, a control member actuated synchronously with said shaft, and means whereby the connecting of the shaft to the rotatable element may be controlled by the control member.

35. In a machine tool, the combination of an operable tool carrying member, means for operating the tool carrying member including a rotatable element, a rotatable shaft, means for connecting and disconnecting the shaft to and from the rotatable element, a control member actuated synchronously with said shaft, means whereby connecting of the shaft to the rotatable element may be controlled by the control member, and manually operable means whereby the connecting of the shaft to the rotatable element may be controlled manually.

36. In a machine tool, the combination of an operable tool carrying member, means for operating the tool carrying member including a rotatable element, a rotatable shaft, means for connecting or disconnecting the shaft to or from the rotatable element, a control member actuated synchronously with said shaft, means whereby the connecting of the shaft to the rotatable element may be controlled by the control member, and means whereby the disconnecting of the shaft from the rotatable element is controlled by the rotatable element.

37. In a machine tool, the combination of an operable tool carrying member, means for operating the tool carrying member including a rotatable element, a rotatable shaft, means for connecting or disconnecting the shaft to or from the rotatable element, a control member actuated synchronously with said shaft, means whereby the connecting of the shaft to the rotatable element may be controlled by the control member, manually operable means whereby the connecting of the shaft to the rotatable element may be controlled manually, and means whereby the disconnecting of the shaft from the rotatable element is controlled by the rotatable element.

38. In a machine tool, the combination of an operable tool carrying member, means for operating the tool carrying member including a rotatable element, a rotatable shaft, means for connecting or disconnecting the shaft to or from the rotatable element, a control member actuated synchronously with said shaft, means controlled by the control member to operate said connecting means for connecting the shaft to the rotatable element, manually operable means to operate said connecting means to connect the shaft to the rotatable element, and means for shifting the control from manual control to control by said control member, or vice versa.

39. In a machine tool having cooperating members for performing work upon a workpiece; a rotatable shaft; an actuating mechanism for at least one of said members including means for connecting said member with said shaft for moving said member in opposite directions when the shaft is rotating in one direction; a control device actuated synchronously with said shaft; means actuated by the control device for causing the effective operation of said connecting means to move said member in either direction; and other means operated by a part actuated by said member actuating mechanism, when said member is in a predetermined position, to operate said connecting means for stopping the movement of that portion of said actuating mechanism between it and said member.

40. In a machine tool, the combination of an operable tool carrying member, means for operating the tool carrying member including a rotatable element, a rotatable shaft, disconnectable means for connecting the rotatable element with the shaft for movement in one direction, disconnectable means for connecting the rotatable element with the shaft for movement in a reverse direction, a control member actuated synchronously with said shaft, means controlled by the control member for operating either of said connecting means for connecting the shaft to the rotatable element.

41. In a machine tool, a combination of a spindle and a slide, a feed shaft for the slide, means for actuating the feed shaft, a control element actuated synchronously with the feed shaft, rotatable means for moving said slide, disconnectable means for connecting said rotatable means with the feed shaft for movement of the slide in a forward direction, disconnectable means for connecting the rotatable element with the feed shaft for movement of the slide in a reverse direction, means actuated by the control element for operating either of said connecting means for connecting the rotatable element with the feed shaft and actuated by the rotatable element itself for disconnecting either of said connecting means.

42. In a machine tool, the combination of cooperating members for performing work upon a workpiece, means for operating at least one of said members including a rotatable element, a rotatable shaft, means for connecting the rotatable element with the shaft for movement in one direction, means for connecting the rotatable element with the shaft for movement in a reverse direction, a control device actuated synchronously with said shaft, means controlled by the control device for operating both of said connecting means for connecting the shaft to the rotatable element, and manually operable means for operating both of said connecting means for connecting the shaft to the rotatable element.

43. In a machine tool, the combination of cooperating members for performing work upon a workpiece, means for operating at least one of said members including a rotatable element, a rotatable shaft, means for connecting the rotatable element with the shaft for movement in one direction, means for connecting the rotatable element with the shaft for movement in a reverse direction, a control device actuated synchronously with said shaft, means controlled by the control device for operating both of said connecting means for connecting the shaft to the rotatable element, manually operable means for operating both of said connecting means for connecting the shaft to the rotatable element, and means actuated by the rotatable element for operating both of said connecting means for disconnecting the shaft from the rotatable element.

44. In a machine tool, the combination of cooperating members for performing work upon a workpiece, means for operating at least one of said members including a rotatable element, a rotatable shaft, means for connecting the rotatable element with the shaft for movement in one direction, means for connecting the rotatable element with the shaft for movement in a reverse direction, means for braking the rotatable element when not connected with said shaft, a control device actuated synchronously with said shaft, means controlled by the control device for operating both of said connecting means for connecting the shaft to the rotatable element, manually operable means for operating both of said connecting means for connecting the shaft to the rotatable element, and means actuated by the rotatable element for operating both of said connecting means, for disconnecting the shaft from the rotatable element and for applying said braking means.

45. In a machine tool, the combination of a rotatable spindle and a slide mounted for cooperation with the spindle, a feed shaft for the slide, means for actuating the feed shaft, a control element actuated synchronously with the feed shaft, means for reciprocating said slide which includes a connection with the feed shaft having magnetic clutch means operable for imparting movement in either direction to the slide from the feed shaft, means actuated by said control element for operating said magnetic clutch means to connect the feed shaft with said slide actuating means for moving the same in either direction, other magnetic means for stopping said slide reciprocating means, and means operated by the slide actuated means for disconnecting said magnetic clutch means and causing effective operation of said magnetic stopping means.

46. In a machine tool, a spindle, a plurality of slides mounted in cooperative relation with the spindle, a feed shaft for said slides, separate means for actuating each of said slides respectively from the feed shaft, operable connections between each of said separate actuating means and the feed shaft and each of said connections including a magnetic clutch means, operable connections between each of said separate actuating means and its respective slide, means controlled manually and automatically from an operating part of the machine for operating each of said magnetic clutch means, other magnetic means for stopping the operation of said slides, and means operated by a moving part on the slide side of said clutch means, respectively, for disconnecting its magnetic clutch means and for effectively operating said magnetic stopping means.

47. In a machine tool, the combination of cooperating members for performing work upon a workpiece, means for operating at least one of said members including a rotatable element, a rotatable shaft, means for connecting or disconnecting the shaft to or from the rotatable element, a control device actuated synchronously with said shaft, means controlled by the control device to operate said connecting means for connecting the shaft to the rotatable element, means for reversing said shaft, and means for rendering the connecting means inoperable, when the shaft is reversed.

48. In a machine tool, the combination of cooperating members for performing work upon a workpiece, means for operating at least one of said members including a rotatable element, a rotatable shaft, means for connecting or disconnecting the shaft to or from the rotatable element, means for braking the rotatable element when not connected to the shaft, a control device actuated synchronously with said shaft, means controlled by the control device to operate said connecting means for connecting the shaft to the rotatable element, manually operable means for operating said connecting means to connect the shaft to the rotatable element, means controlled by the rotatable element for operating said connecting means to disconnect the shaft from the rotatable element, means for reversing the shaft, and means for rendering the connecting means inoperable when the shaft is reversed.

49. In a machine tool, a spindle and a feed shaft, a driving connection between said spindle and the feed shaft for driving the feed shaft in one direction only for the purpose of performing work, a reversible driving member connected with the feed shaft for driving the latter, means rendering effective and ineffective the drive of the feed shaft from the spindle and the reversible driving member, a plurality of slides mounted in cooperative relation with the spindle, separate means for actuating each of said slides respectively, an operable connection between each of said separate means and said feed shaft and each including a magnetic clutch; automatic and manual means for controlling said means for rendering effective and ineffective said reversible member and said feed shaft driving connection from the spindle, said control means including means permitting the reversible driving member to actuate the feed shaft in the same direction only as when driven by the spindle, when said parts of the machine are under automatic control but, when under manual control, permitting said feed shaft to be driven by said reversible driving member in either direction; and means actuated by the control means for causing said magnetic clutches to connect the feed shaft with the slide operating means and actuated by the slide actuating means itself, when in a predetermined position, for disconnecting the slide actuating means from the feed shaft.

50. In a machine tool, the combination of a rotatable spindle and a reciprocable slide for cooperating with said spindle for performing work, a turret rotatably mounted on said slide, means for indexing said turret, means for locking said turret in its indexed position including fixed co-acting members in turret and slide, and means for unlocking said turret including means for separating said turret and slide so that said fixed members do not co-act.

51. In a machine tool, the combination of a spindle and a feed shaft and bearings therefor, means for driving said spindle, independent means for driving said shaft, lubricating means for delivering lubricant to said spindle and shaft bearings including a power driven pump, and control means for causing said pump to be operated when either or both of said driving means are operated.

52. In a machine tool, the combination of a spindle and a feed shaft and bearings therefor, means for driving said spindle including an electric motor, independent means for driving said shaft including an electric motor, lubricating means for delivering lubricant to the said actuating parts and including an electric motor driven pump, and control means for causing said pump motor to be energized when either or both of the driving motors are energized and to be de-energized when neither of said driving motors is energized.

53. In a machine tool, the combination of a spindle and a slide mounted for cooperative functions, a guard for shielding the exposed portions of the slide and spindle and movable to shielding and unshielding positions, a power means for moving the guard to shielding and unshielding positions, an automatic control element for controlling the operations of said slide, and means controlled by said automatic control element for controlling the operations of said power means.

54. In a machine tool comprising a frame, a spindle having an exposed portion, a slide mounted for cooperation with the spindle and arranged in an inclined plane with respect to the vertical, a substantially vertical guard reciprocably mounted on the frame in front of said slide and having a movement to expose said slide and spindle and to shield the same from the front of the machine, means for reciprocating said guard including a motor, manual means for operating the motor to reciprocate said guard to open and closed positions, automatic means for controlling the functions of said machine and for controlling the means for moving the guard to shielding and unshielding position.

55. In a machine tool, a spindle or spindles, a driving member for the spindle, speed change means for varying the speed of the spindle from the driving member; a feed shaft, a slide or slides driven by the feed shaft; a drive connection between the spindle and the feed shaft and including a variable speed change means, whereby the feed shaft may be driven from the spindle at a selected constant ratio with respect thereto; a constant speed driving means connected with said feed shaft; means including electric switches and circuits therefor for rendering effective and ineffective either the drive connection from the spindle or the drive from the constant speed driving means; an automatic control means actuated synchronously with the feed shaft and including electrical switches and circuits therefor for controlling the speed change means between the driving member and the spindle and between the spindle and the feed shaft, the connection of the feed shaft with the spindle and the drive of said feed shaft from said constant speed driving means.

56. In a machine tool, a spindle or spindles, a driving member for the spindle, a drive connection between the driving member including speed change means for varying the speed of the spindle from the driving member; a feed shaft, a slide or slides driven by the feed shaft; a drive connection between the spindle and the feed shaft and including a variable speed change means, whereby the feed shaft may be driven from the spindle at a selected constant ratio with respect thereto; a constant speed driving means connected with said feed shaft; means for rendering effective and ineffective the drive of said feed shaft from either the spindle or the drive from the constant speed driving means; an automatic control means actuated synchronously with the feed shaft and a manual control means, both said control means controlling both of said speed change means and said means for rendering effective and ineffective the drive of the feed shaft from either the spindle or said constant speed driving means; and means for completely shifting from the automatic control means to the manual control means and for rendering the automatic control means ineffective, or vice versa.

57. In a machine tool, a spindle or spindles, a driving member for the spindle, speed change means for varying the speed of the spindle from the driving member; a feed shaft, a slide or slides driven by the feed shaft; a drive connection from the spindle to the feed shaft and including a variable speed change means, whereby the feed shaft may be driven from the spindle at a selected constant ratio with respect thereto; a constant speed driving member; an operable drive connection from said constant speed driving member to said feed shaft, whereby the latter may be driven at a constant speed; means including electric switches and circuits therefor for rendering effective the drive of the feed shaft from the drive connection from the spindle and for correspondingly rendering ineffective the drive of said feed shaft from the constant speed driving means and conversely; an automatic control means actuated synchronously with the feed shaft, electrical means including switches and circuits therefor for selecting the ratio of either of said speed change means and controlled by said automatic control means, said control means also controlling the means for rendering effective and ineffective the drive of the feed shaft from either the spindle or the constant speed driving member.

58. In a machine tool, a work holding member and a tool holding member having relative cooperating movement, a chuck on the work holding member and having operable opening and closing work holding parts, means for opening and closing said chuck parts and for applying pressure thereto, means for varying said pressure, means including a shaft for presenting one of said members to the other, a control device actuated synchronously with said shaft, means operated by said control device including electrical switches and circuits therefor for controlling operation of the opening and closing means of said chuck parts, and controlling the pressure varying means.

59. In a machine tool, as set forth in claim 58, wherein said means operated by said control device also includes switch interlocks in said circuits for preventing concurrent operation of means controlled thereby.

60. In a machine tool as set forth in claim 58, wherein said means operated by said control device further includes switch interlocks in said circuits for preventing concurrent operation of said means controlled thereby, and manually operated switches in said circuits for controlling said operating means.

61. In a machine tool, a removable rotatable member, a support for one end of said member, said member and support having complemental engaging surfaces, a removable stud for supporting the other end of said member, a bearing on said other end of said member and having an opening therein through which said stud extends to journal said bearing thereon.

62. In a machine tool, a removable rotatable member, a support for one end of said member, said member and support having complemental engaging surfaces, a removable stud for supporting the other end of said member, a bearing on said other end of said member and having an opening therein through which said stud extends to journal said bearing thereon, said stud being adjustable to take up end thrust of said member.

63. In a machine tool, a removable rotatable member, a support for one end of said member, said member and support having complemental engaging surfaces, a removable stud for supporting the other end of said member, a bearing on said other end of said member and having an opening therein through which said stud extends to journal said bearing thereon, a cradle-like member below said rotatable member in which it may rest, when said stud is removed and said member is disengaged from said support.

64. In a machine tool, a removable rotatable member, a support for one end of said member, said member and support having complemental engaging surfaces, a removable stud for supporting the other end of said member, a bearing on said other end of said member and having an opening therein through which said stud extends to journal said bearing thereon, a cradle-like member below said rotatable member in which it may rest, when said stud is removed and said member is disengaged from said support, and runways leading from said cradle-like member for permitting said rotatable member to be rolled to and from said cradle-like member.

65. In a machine tool, a removable rotatable member, a support for one end of said member, said member and support having complemental chamfered engaging surfaces, a removable stud for supporting the other end of said member, a bearing on said other end of said member and having an opening therein through which said stud extends to journal said bearing thereon and having a tapered extremity and a rearward shoulder, a cradle-like member below said rotatable member in which it may rest, when said stud is removed and said member is disengaged from said support; said cradle-like member being so positioned that, when said rotatable member is resting thereon, the latter is approximately centered with respect to said support and said stud, whereby the tapered end of said stud may enter said bearing opening, when inserted, and further inserting of the stud will cause said shoulder to move the rotatable member to engage said chamfered surfaces until the rotatable member is in operable position on said support and stud and unsupported by said cradle member.

66. The combination as set forth in claim 65 further characterized by said support being rotatable and having said chamfered surface thereon concentric with its axis which latter is in substantial alignment with said stud, and means for keying said rotatable member with said rotatable support.

67. In a machine tool, a removable rotatable drum-like member, a rotatable support for one end of said drum member, said drum member and support having complemental engaging chamfered surfaces, a removable stud for supporting the other end of said drum member, a bearing on said other end of said drum member and having an opening therein through which the stud extends to journal said bearing thereon, said chamfered surface on said support being substantially concentric with the axis of said support, whereby said drum member may be readily centered in position on said support, means on said stud to maintain said chamfered surfaces in engagement, whereby upon removal of the stud the drum member may be readily disengaged from said support.

68. In a machine tool, a hollow spindle, a chuck on the spindle and having a center opening therein; a back-facer within the chuck opening, a reciprocal rod in said spindle and extending rearwardly of the spindle, a sleeve on said rod, means adjustably connecting said sleeve and rod and permitting relative adjustment longitudinally with respect to each other, and means for reciprocating said sleeve.

69. In a machine tool, the combination as set forth in claim 68, between said reciprocating means comprises a driving member, a rotatable actuating member having an operable connection with said sleeve, and magnetic actuated clutch means between said driving member and rotatable actuating member.

70. In a machine tool, a rotatable spindle having a chuck, a tool slide for cooperation with the spindle for performing work on a work piece held by the chuck, means for reciprocating the slide to and from the work, an automatic control means actuated synchronously with the slide reciprocating means for controlling said work performing operations, a backfacer associated with the spindle and disposed to the rear of the work to be held in said chuck, means actuated by the slide reciprocating means for reciprocating the backfacer to and from the work and including a magnetic actuated clutch means, and means for actuating said magnetic clutch means from said automatic control means for connecting the backfacer actuating means with the slide actuating means, and means actuated by a moving part of the backfacer actuating means for disconnecting said clutch means.

71. In a machine tool, the combination of a spindle and a slide mounted for cooperative functions, a guard for shielding the exposed portions of the slide and spindle and movable to shielding and unshielding positions, a reversible motor for moving the guard to shielding and unshielding positions, an automatic control element for controlling the operations of said slide, means controlled by said automatic control element for controlling the operations of said reversible motor, and means controlled by said guard for causing said motor to reverse its operation when next caused to operate by said motor control means.

MYRON S. CURTIS.